(12) United States Patent
Bowles

(10) Patent No.: US 11,080,672 B2
(45) Date of Patent: *Aug. 3, 2021

(54) SYSTEMS AND METHODS FOR RECYCLING CONSUMER ELECTRONIC DEVICES

(71) Applicant: ecoATM, LLC, San Diego, CA (US)

(72) Inventor: Mark Vincent Bowles, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 935 days.

This patent is subject to a terminal disclaimer.

(21) Appl. No.: 14/966,346

(22) Filed: Dec. 11, 2015

(65) Prior Publication Data

US 2016/0171456 A1 Jun. 16, 2016

Related U.S. Application Data

(60) Provisional application No. 62/091,426, filed on Dec. 12, 2014.

(51) Int. Cl.
*G06Q 20/18* (2012.01)
*G06Q 20/20* (2012.01)
(Continued)

(52) U.S. Cl.
CPC ............. *G06Q 20/18* (2013.01); *G06Q 10/30* (2013.01); *G06Q 20/208* (2013.01);
(Continued)

(58) Field of Classification Search
CPC ...... G06Q 20/208; G06Q 20/18; G06Q 10/30; G06Q 30/0278; G07F 7/06
See application file for complete search history.

(56) References Cited

U.S. PATENT DOCUMENTS 3,808,439 A 4/1974 Renius
4,248,334 A 2/1981 Hanley et al.
(Continued)

FOREIGN PATENT DOCUMENTS

CN 1365479 A1 8/2002
CN 2708415 A1 7/2005
(Continued)

OTHER PUBLICATIONS

Graffia, et al. "Retail Station for E-Device Identification, Assessment, and Trade-In", Jun. 6, 2014 (Drawing and Specification) (Year: 2014).*

(Continued)

*Primary Examiner* — Asfand M Sheikh
(74) *Attorney, Agent, or Firm* — Perkins Coie LLP

(57) ABSTRACT

Systems and associated methods for recycling and performing other processes with consumer electronic devices are described herein. In various embodiments, the present technology includes systems and methods for identifying and evaluating a used or pre-owned consumer electronic device, such as a mobile phone, laptop, etc. to facilitate purchasing the device. In some embodiments, the present technology includes a counter-top evaluation terminal that evaluates a device and facilitates purchase and recycling of the device. Various other aspects of the present technology are described herein.

16 Claims, 7 Drawing Sheets

(51) Int. Cl.
  *G06Q 30/02* (2012.01)
  *G06Q 10/00* (2012.01)
  *G07F 7/06* (2006.01)
(52) U.S. Cl.
  CPC ........... *G06Q 30/0278* (2013.01); *G07F 7/06* (2013.01); *Y02W 30/82* (2015.05); *Y02W 90/00* (2015.05)

(56) References Cited

U.S. PATENT DOCUMENTS

| | | |
|---|---|---|
| 4,519,522 A | 5/1985 | McElwee |
| 4,593,820 A | 6/1986 | Antonie |
| 4,715,709 A | 12/1987 | Sekine et al. |
| 4,821,118 A | 4/1989 | Lafreniere |
| 4,845,636 A | 7/1989 | Walker |
| 4,870,357 A | 9/1989 | Young et al. |
| 4,878,736 A | 11/1989 | Hekker et al. |
| 4,927,051 A | 5/1990 | Falk et al. |
| 4,951,308 A | 8/1990 | Bishop et al. |
| 5,027,074 A | 6/1991 | Haferstat |
| 5,077,462 A | 12/1991 | Newell et al. |
| 5,091,773 A | 2/1992 | Fouche et al. |
| 5,105,149 A | 4/1992 | Tokura |
| 5,216,502 A | 6/1993 | Katz |
| 5,280,170 A | 1/1994 | Baldwin |
| 5,319,459 A | 6/1994 | Mochizuki et al. |
| 5,339,096 A | 8/1994 | Beaufort et al. |
| 5,419,438 A | 5/1995 | Squyres et al. |
| 5,436,554 A | 7/1995 | Decker |
| 5,570,920 A | 11/1996 | Crisman et al. |
| 5,572,444 A | 11/1996 | Lentz et al. |
| 5,610,710 A | 3/1997 | Canfield et al. |
| 5,717,780 A | 2/1998 | Mitsumune et al. |
| 5,747,784 A | 5/1998 | Walter et al. |
| 5,748,084 A | 5/1998 | Isikoff |
| 5,775,806 A | 7/1998 | Allred |
| 5,839,058 A | 11/1998 | Phillips et al. |
| 5,920,338 A | 7/1999 | Katz |
| 5,949,901 A | 9/1999 | Nichani et al. |
| 5,965,858 A | 10/1999 | Suzuki et al. |
| 5,966,654 A | 10/1999 | Croughwell et al. |
| 5,987,159 A | 11/1999 | Nichani |
| 5,988,431 A | 11/1999 | Roe |
| 6,029,851 A | 2/2000 | Jenkins et al. |
| 6,041,229 A | 3/2000 | Turner |
| 6,055,512 A | 4/2000 | Dean et al. |
| 6,100,986 A | 8/2000 | Rydningen |
| 6,181,805 B1 | 1/2001 | Koike et al. |
| 6,228,008 B1 | 5/2001 | Pollington et al. |
| 6,259,827 B1 | 7/2001 | Nichani |
| 6,264,104 B1 | 7/2001 | Jenkins et al. |
| 6,330,354 B1 | 12/2001 | Companion et al. |
| 6,330,958 B1 | 12/2001 | Ruskin et al. |
| 6,393,095 B1 | 5/2002 | Robinson |
| 6,462,644 B1 | 10/2002 | Howell et al. |
| 6,529,837 B1 | 3/2003 | Kang |
| 6,535,637 B1 | 3/2003 | Wootton et al. |
| 6,573,886 B1 | 6/2003 | Lehtinen et al. |
| 6,587,581 B1 | 7/2003 | Matsuyama et al. |
| 6,595,684 B1 | 7/2003 | Casagrande et al. |
| 6,597,552 B1 | 7/2003 | Griepentrog et al. |
| 6,633,377 B1 | 10/2003 | Weiss et al. |
| 6,667,800 B1 | 12/2003 | Larsson et al. |
| 6,748,296 B2 | 6/2004 | Banerjee et al. |
| 6,754,637 B1 | 6/2004 | Stenz |
| 6,758,370 B2 | 7/2004 | Cooke et al. |
| 6,798,528 B1 | 9/2004 | Hartman |
| 6,822,422 B2 | 11/2004 | Sagawa |
| 6,842,596 B2 | 1/2005 | Morii et al. |
| 6,854,656 B2 | 2/2005 | Matsumori |
| 6,947,941 B1 * | 9/2005 | Koon ............... G06Q 20/20 707/697 |
| 7,069,236 B1 | 6/2006 | Tsunenari |
| 7,076,449 B2 | 7/2006 | Tsunenari et al. |
| 7,178,720 B1 | 2/2007 | Strubbe et al. |
| 7,234,609 B2 | 6/2007 | DeLazzer et al. |
| 7,251,458 B2 | 7/2007 | O'Connell |
| 7,268,345 B2 | 9/2007 | Schultz |
| 7,334,729 B2 | 2/2008 | Brewington |
| 7,455,226 B1 | 11/2008 | Hammond et al. |
| 7,520,666 B2 | 4/2009 | Pevzner et al. |
| 7,529,687 B1 * | 5/2009 | Phan ............... G06Q 20/201 705/14.67 |
| 7,567,344 B2 | 7/2009 | LeBlanc et al. |
| 7,646,193 B2 | 1/2010 | Suzuki et al. |
| 7,649,450 B2 | 1/2010 | Campion et al. |
| 7,702,108 B2 | 4/2010 | Amon et al. |
| 7,735,125 B1 | 6/2010 | Alvarez et al. |
| 7,761,331 B2 | 7/2010 | Low et al. |
| 7,783,379 B2 | 8/2010 | Beane et al. |
| 7,848,833 B2 | 12/2010 | Li |
| 7,881,965 B2 | 2/2011 | Bowles et al. |
| 8,010,402 B1 | 8/2011 | Sharma et al. |
| 8,019,588 B1 | 9/2011 | Wohlberg et al. |
| 8,025,229 B2 | 9/2011 | Hammond et al. |
| 8,031,930 B2 | 10/2011 | Wang et al. |
| 8,107,243 B2 | 1/2012 | Guccione et al. |
| 8,112,325 B2 | 2/2012 | Foy et al. |
| 8,195,511 B2 | 6/2012 | Bowles et al. |
| 8,200,533 B2 | 6/2012 | Librizzi et al. |
| 8,200,736 B2 | 6/2012 | Shi |
| 8,215,546 B2 | 7/2012 | Lin et al. |
| 8,239,262 B2 | 8/2012 | Bowles et al. |
| 8,254,883 B2 | 8/2012 | Uchida |
| 8,266,008 B1 | 9/2012 | Siegel et al. |
| 8,423,404 B2 | 4/2013 | Bowles et al. |
| 8,429,021 B2 * | 4/2013 | Kraft ............... G06Q 20/20 705/26.1 |
| 8,463,646 B2 | 6/2013 | Bowles et al. |
| 8,543,358 B2 | 9/2013 | Trabona |
| 8,566,183 B1 | 10/2013 | Bonar et al. |
| 8,606,633 B2 | 12/2013 | Tarbert et al. |
| 8,718,717 B2 | 5/2014 | Vaknin et al. |
| 8,743,215 B1 | 6/2014 | Lee |
| 8,755,783 B2 | 6/2014 | Brahami et al. |
| 8,806,280 B2 | 8/2014 | Stephenson |
| 8,823,794 B2 | 9/2014 | Suzuki et al. |
| 8,824,136 B1 | 9/2014 | Interian et al. |
| 9,010,627 B1 | 4/2015 | Prasad et al. |
| 9,043,026 B2 | 5/2015 | Lien et al. |
| 9,189,911 B2 | 11/2015 | Kavli et al. |
| 9,195,979 B2 * | 11/2015 | Geller ............... G06Q 40/00 |
| 9,256,863 B2 | 2/2016 | Chayon et al. |
| 9,317,989 B2 * | 4/2016 | Grow ............... G07F 9/026 |
| 9,355,515 B2 | 5/2016 | Brahami et al. |
| 9,367,982 B2 | 6/2016 | Chayon et al. |
| 9,378,606 B2 | 6/2016 | Chayun et al. |
| 9,582,101 B2 | 2/2017 | Chang et al. |
| 9,595,238 B2 | 3/2017 | Won |
| 9,697,548 B1 * | 7/2017 | Jaff ............... G06Q 30/0601 |
| 9,818,160 B2 | 11/2017 | Bowles et al. |
| 9,881,284 B2 | 1/2018 | Bowles et al. |
| 9,885,672 B2 | 2/2018 | Forutanpour et al. |
| 9,904,911 B2 | 2/2018 | Bowles et al. |
| 9,911,102 B2 | 3/2018 | Bowles |
| 9,934,644 B2 | 4/2018 | Chayun et al. |
| 10,032,140 B2 | 7/2018 | Bowles et al. |
| 10,055,798 B2 | 8/2018 | Bowles et al. |
| 10,157,379 B2 | 12/2018 | Singh |
| 10,157,427 B2 | 12/2018 | Bowles et al. |
| 10,496,963 B2 | 12/2019 | Silva et al. |
| 10,572,946 B2 | 2/2020 | Bowles et al. |
| 10,825,082 B2 | 11/2020 | Librizzi et al. |
| 10,853,873 B2 | 12/2020 | Bowles et al. |
| 10,860,990 B2 | 12/2020 | Bowles et al. |
| 2001/0039531 A1 | 11/2001 | Aoki |
| 2002/0014577 A1 | 2/2002 | Ulrich et al. |
| 2002/0035515 A1 | 3/2002 | Moreno |
| 2002/0067184 A1 | 6/2002 | Smith et al. |
| 2002/0087413 A1 | 7/2002 | Mahaffy et al. |
| 2002/0112177 A1 | 8/2002 | Voltmer |
| 2002/0129170 A1 | 9/2002 | Moore et al. |
| 2002/0157033 A1 | 10/2002 | Cox |

(56) References Cited

U.S. PATENT DOCUMENTS

| | | |
|---|---|---|
| 2002/0162966 A1 | 11/2002 | Yoder |
| 2002/0186878 A1 | 12/2002 | Hoon et al. |
| 2003/0006277 A1 | 1/2003 | Maskatiya et al. |
| 2003/0018897 A1* | 1/2003 | Bellis, Jr. ............. G06Q 20/341 713/182 |
| 2003/0025476 A1 | 2/2003 | Trela |
| 2003/0036866 A1 | 2/2003 | Nair et al. |
| 2003/0061150 A1 | 3/2003 | Kocher |
| 2003/0100707 A1* | 5/2003 | Hwang ................. C07K 19/00 530/350 |
| 2003/0146898 A1 | 8/2003 | Kawasaki et al. |
| 2003/0170529 A1 | 9/2003 | Sagawa |
| 2003/0191675 A1 | 10/2003 | Murashita |
| 2003/0197782 A1 | 10/2003 | Ashe |
| 2003/0204289 A1 | 10/2003 | Banerjee et al. |
| 2004/0012825 A1 | 1/2004 | Tesavis |
| 2004/0088231 A1 | 5/2004 | Davis |
| 2004/0114153 A1 | 6/2004 | Andersen et al. |
| 2004/0141320 A1 | 7/2004 | Bock et al. |
| 2004/0150815 A1 | 8/2004 | Sones et al. |
| 2004/0156557 A1 | 8/2004 | Van Der Weij |
| 2004/0156667 A1 | 8/2004 | Berger et al. |
| 2004/0186744 A1 | 9/2004 | Lux |
| 2004/0189812 A1 | 9/2004 | Gustaysson |
| 2004/0200902 A1 | 10/2004 | Ishioroshi |
| 2004/0205015 A1 | 10/2004 | DeLaCruz |
| 2004/0235513 A1 | 11/2004 | O'Connell |
| 2004/0242216 A1 | 12/2004 | Boutsikakis |
| 2004/0262521 A1 | 12/2004 | Devitt et al. |
| 2005/0027622 A1 | 2/2005 | Walker et al. |
| 2005/0043897 A1 | 2/2005 | Meyer |
| 2005/0109841 A1 | 5/2005 | Ryan et al. |
| 2005/0128551 A1 | 6/2005 | Yang |
| 2005/0137942 A1* | 6/2005 | LaFleur ............. G06Q 30/0601 705/26.1 |
| 2005/0139661 A1 | 6/2005 | Eglen et al. |
| 2005/0143149 A1 | 6/2005 | Becker et al. |
| 2005/0167620 A1 | 8/2005 | Cho et al. |
| 2005/0187657 A1 | 8/2005 | Hashimoto et al. |
| 2005/0216120 A1 | 9/2005 | Rosenberg et al. |
| 2005/0222690 A1 | 10/2005 | Wang et al. |
| 2005/0231595 A1 | 10/2005 | Wang et al. |
| 2005/0240958 A1 | 10/2005 | Nguyen et al. |
| 2006/0047573 A1 | 3/2006 | Mitchell et al. |
| 2006/0074756 A1 | 4/2006 | Boykin |
| 2006/0085158 A1 | 4/2006 | Cakiner |
| 2006/0167580 A1 | 7/2006 | Whittier |
| 2006/0184379 A1 | 8/2006 | Tan et al. |
| 2006/0195384 A1 | 8/2006 | Bauer et al. |
| 2006/0217152 A1 | 9/2006 | Fok et al. |
| 2006/0219776 A1 | 10/2006 | Finn |
| 2006/0229108 A1 | 10/2006 | Cehelnik |
| 2006/0235747 A1 | 10/2006 | Hammond et al. |
| 2006/0258008 A1 | 11/2006 | Holler et al. |
| 2006/0261931 A1 | 11/2006 | Cheng |
| 2006/0271431 A1 | 11/2006 | Wehr et al. |
| 2006/0279307 A1 | 12/2006 | Wang et al. |
| 2006/0280356 A1 | 12/2006 | Yamagishi |
| 2007/0012665 A1 | 1/2007 | Nelson |
| 2007/0013124 A1 | 1/2007 | Graef et al. |
| 2007/0032098 A1 | 2/2007 | Bowles et al. |
| 2007/0057815 A1 | 3/2007 | Foy et al. |
| 2007/0129906 A1 | 6/2007 | Stoecker et al. |
| 2007/0133844 A1 | 6/2007 | Waehner et al. |
| 2007/0140310 A1 | 6/2007 | Rolton et al. |
| 2007/0150403 A1 | 6/2007 | Mock et al. |
| 2007/0205751 A1 | 9/2007 | Suzuki et al. |
| 2007/0258085 A1 | 11/2007 | Robbins |
| 2007/0263099 A1 | 11/2007 | Motta et al. |
| 2007/0269099 A1 | 11/2007 | Nishino et al. |
| 2007/0276911 A1 | 11/2007 | Bhumkar |
| 2007/0281734 A1 | 12/2007 | Mizrachi |
| 2007/0282999 A1 | 12/2007 | Tu et al. |
| 2008/0004828 A1 | 1/2008 | Mizrachi |
| 2008/0027581 A1 | 1/2008 | Saether et al. |
| 2008/0033596 A1 | 2/2008 | Fausak et al. |
| 2008/0071627 A1* | 3/2008 | Junger ................. G06Q 20/203 705/22 |
| 2008/0097770 A1 | 4/2008 | Low et al. |
| 2008/0109746 A1 | 5/2008 | Mayer |
| 2008/0111989 A1 | 5/2008 | Dufour et al. |
| 2008/0149720 A1 | 6/2008 | Colville |
| 2008/0177598 A1 | 7/2008 | Davie |
| 2008/0207198 A1 | 8/2008 | Juric |
| 2008/0231113 A1 | 9/2008 | Guccione et al. |
| 2008/0255901 A1 | 10/2008 | Carroll et al. |
| 2008/0256008 A1 | 10/2008 | Kwok |
| 2008/0281691 A1 | 11/2008 | Pearson et al. |
| 2008/0296374 A1 | 12/2008 | Gonen et al. |
| 2008/0303915 A1 | 12/2008 | Omi |
| 2008/0306701 A1 | 12/2008 | Zhong et al. |
| 2009/0051907 A1 | 2/2009 | Li et al. |
| 2009/0078775 A1 | 3/2009 | Giebel et al. |
| 2009/0079388 A1 | 3/2009 | Reddy |
| 2009/0095047 A1 | 4/2009 | Patel et al. |
| 2009/0114716 A1 | 5/2009 | Ramachandran |
| 2009/0132813 A1 | 5/2009 | Schibuk |
| 2009/0160668 A1* | 6/2009 | Crowley ............. G06Q 20/1085 340/679 |
| 2009/0184865 A1 | 7/2009 | Valo et al. |
| 2009/0190142 A1 | 7/2009 | Taylor et al. |
| 2009/0207743 A1 | 8/2009 | Huq et al. |
| 2009/0244285 A1 | 10/2009 | Chathukutty |
| 2009/0247133 A1 | 10/2009 | Holmen et al. |
| 2009/0248883 A1 | 10/2009 | Suryanarayana et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2010/0005004 A1 | 1/2010 | Hudak et al. |
| 2010/0063894 A1 | 3/2010 | Lundy |
| 2010/0088192 A1 | 4/2010 | Bowles et al. |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0157280 A1 | 6/2010 | Kusevic et al. |
| 2010/0161397 A1 | 6/2010 | Gauthier et al. |
| 2010/0162359 A1 | 6/2010 | Casey et al. |
| 2010/0169231 A1 | 7/2010 | Bowles et al. |
| 2010/0185506 A1 | 7/2010 | Wolff |
| 2010/0219234 A1 | 9/2010 | Forbes |
| 2010/0228676 A1 | 9/2010 | Librizzi et al. |
| 2010/0235198 A1 | 9/2010 | Fini et al. |
| 2010/0237854 A1 | 9/2010 | Kumhyr et al. |
| 2010/0262481 A1 | 10/2010 | Baker et al. |
| 2011/0035322 A1 | 2/2011 | Lively |
| 2011/0043628 A1 | 2/2011 | Yun |
| 2011/0060641 A1 | 3/2011 | Grossman et al. |
| 2011/0066514 A1* | 3/2011 | Maraz ................. G06Q 20/20 705/17 |
| 2011/0067520 A1 | 3/2011 | Ihrke et al. |
| 2011/0113479 A1 | 5/2011 | Ganem |
| 2011/0235853 A1 | 9/2011 | Bowles et al. |
| 2011/0313840 A1 | 12/2011 | Mason et al. |
| 2012/0016518 A1 | 1/2012 | Saario et al. |
| 2012/0026582 A1* | 2/2012 | Okabe ................. G02B 21/36 359/380 |
| 2012/0029985 A1 | 2/2012 | Wilson et al. |
| 2012/0030097 A1 | 2/2012 | Hagan et al. |
| 2012/0054113 A1 | 3/2012 | Jayaraman et al. |
| 2012/0063501 A1 | 3/2012 | Aguren |
| 2012/0078413 A1 | 3/2012 | Baker, Jr. |
| 2012/0116928 A1 | 5/2012 | Gventer et al. |
| 2012/0116929 A1 | 5/2012 | Gventer et al. |
| 2012/0117001 A1 | 5/2012 | Gventer et al. |
| 2012/0127307 A1 | 5/2012 | Hassenzahl |
| 2012/0146956 A1 | 6/2012 | Jenkinson |
| 2012/0191562 A1 | 7/2012 | Bowles et al. |
| 2012/0235812 A1 | 9/2012 | De Mello et al. |
| 2012/0254046 A1 | 10/2012 | Librizzi et al. |
| 2012/0280934 A1 | 11/2012 | Ha |
| 2012/0303431 A1 | 11/2012 | Phillips et al. |

(56) References Cited

U.S. PATENT DOCUMENTS

| | | |
|---|---|---|
| 2013/0006713 A1 | 1/2013 | Haake et al. |
| 2013/0034305 A1 | 2/2013 | Jahanshahi et al. |
| 2013/0046611 A1 | 2/2013 | Bowles et al. |
| 2013/0046699 A1 | 2/2013 | Bowles et al. |
| 2013/0124426 A1 | 5/2013 | Bowles et al. |
| 2013/0126741 A1 | 5/2013 | Srivastava et al. |
| 2013/0137376 A1 | 5/2013 | Fitzgerald et al. |
| 2013/0144797 A1 | 6/2013 | Bowles et al. |
| 2013/0155061 A1 | 6/2013 | Jahanshahi et al. |
| 2013/0159119 A1 | 6/2013 | Henderson et al. |
| 2013/0173434 A1 | 7/2013 | Hartman |
| 2013/0181935 A1 | 7/2013 | McKenzie et al. |
| 2013/0191236 A1 | 7/2013 | Bowles |
| 2013/0198089 A1 | 8/2013 | Bowles |
| 2013/0198144 A1 | 8/2013 | Bowles |
| 2013/0226679 A1 | 8/2013 | Bowles |
| 2013/0246211 A1* | 9/2013 | Sullivan ............... H04W 4/12 705/26.4 |
| 2013/0246212 A1 | 9/2013 | Sullivan |
| 2013/0246285 A1 | 9/2013 | Chayun et al. |
| 2013/0253700 A1 | 9/2013 | Carson et al. |
| 2013/0275314 A1 | 10/2013 | Bowles |
| 2013/0284805 A1 | 10/2013 | Kraft et al. |
| 2013/0290146 A1 | 10/2013 | West et al. |
| 2013/0297388 A1 | 11/2013 | Kyle, Jr. et al. |
| 2014/0006451 A1 | 1/2014 | Mullis et al. |
| 2014/0012643 A1 | 1/2014 | Behrisch |
| 2014/0038556 A1 | 2/2014 | De Sousa |
| 2014/0046845 A1 | 2/2014 | Dogin et al. |
| 2014/0052329 A1* | 2/2014 | Amirpour ............ G07C 5/0808 701/29.6 |
| 2014/0067710 A1 | 3/2014 | Gventer et al. |
| 2014/0143161 A1 | 5/2014 | Ahn |
| 2014/0150100 A1 | 5/2014 | Gupta et al. |
| 2014/0156883 A1 | 6/2014 | Bowles |
| 2014/0214505 A1 | 7/2014 | Shuster-Arechiga et al. |
| 2014/0235258 A1 | 8/2014 | Chen et al. |
| 2014/0244315 A1 | 8/2014 | Cahill et al. |
| 2014/0278244 A1 | 9/2014 | Humphrey et al. |
| 2014/0297368 A1 | 10/2014 | Ferder |
| 2014/0347473 A1 | 11/2014 | Wolff et al. |
| 2015/0006281 A1 | 1/2015 | Takahashi |
| 2015/0066677 A1 | 3/2015 | Bowles et al. |
| 2015/0088731 A1 | 3/2015 | Ackerman |
| 2015/0120485 A1 | 4/2015 | Nash |
| 2015/0170237 A1 | 6/2015 | Powell |
| 2015/0193797 A1 | 7/2015 | Gerrity |
| 2015/0206200 A1* | 7/2015 | Edmondson ....... G06Q 30/0278 705/306 |
| 2015/0278529 A1 | 10/2015 | Cho et al. |
| 2015/0332206 A1 | 11/2015 | Trew et al. |
| 2015/0356637 A1* | 12/2015 | Graffia, II .......... G06Q 30/0278 705/306 |
| 2016/0019607 A1 | 1/2016 | Burmester et al. |
| 2016/0019685 A1 | 1/2016 | Nguyen |
| 2016/0055392 A1 | 2/2016 | Nakano |
| 2016/0091549 A1 | 3/2016 | Snook et al. |
| 2016/0092849 A1 | 3/2016 | Cirannek et al. |
| 2016/0098688 A1 | 4/2016 | Hunt et al. |
| 2016/0098689 A1 | 4/2016 | Bowles et al. |
| 2016/0098690 A1 | 4/2016 | Silva et al. |
| 2016/0125367 A1 | 5/2016 | Bowles et al. |
| 2016/0125548 A1 | 5/2016 | Bowles et al. |
| 2016/0125612 A1 | 5/2016 | Seki et al. |
| 2016/0132840 A1 | 5/2016 | Bowles et al. |
| 2016/0171544 A1 | 6/2016 | Heminger et al. |
| 2016/0171575 A1 | 6/2016 | Bowles et al. |
| 2016/0210648 A1 | 7/2016 | Cirannek |
| 2016/0269401 A1 | 9/2016 | Saito et al. |
| 2016/0275460 A1 | 9/2016 | Ploetner et al. |
| 2016/0275518 A1 | 9/2016 | Bowles et al. |
| 2016/0364939 A1 | 12/2016 | Chayun et al. |
| 2016/0379287 A1 | 12/2016 | Dabiri |
| 2017/0083886 A1 | 3/2017 | Silva et al. |
| 2017/0091823 A1 | 3/2017 | Adinarayan et al. |
| 2017/0169401 A1 | 6/2017 | Beane et al. |
| 2017/0278191 A1 | 9/2017 | Tassone et al. |
| 2017/0286920 A1 | 10/2017 | Silva et al. |
| 2017/0301010 A1 | 10/2017 | Bowles et al. |
| 2017/0323279 A1 | 11/2017 | Dion et al. |
| 2017/0372273 A1 | 12/2017 | Bowles et al. |
| 2018/0247280 A1 | 8/2018 | Bowles et al. |
| 2018/0260794 A1 | 9/2018 | Bowles et al. |
| 2019/0325530 A1 | 10/2019 | Bowles et al. |
| 2020/0090137 A1 | 3/2020 | Bowles et al. |
| 2020/0126046 A1 | 4/2020 | Bowles |
| 2020/0151677 A1 | 5/2020 | Bowles et al. |
| 2020/0151678 A1 | 5/2020 | Silva et al. |
| 2020/0151679 A1 | 5/2020 | Hunt et al. |

FOREIGN PATENT DOCUMENTS

| | | |
|---|---|---|
| CN | 1864088 A1 | 11/2006 |
| CN | 1957320 A1 | 5/2007 |
| CN | 200965706 A1 | 10/2007 |
| CN | 101379488 A | 3/2009 |
| CN | 102246384 A1 | 11/2011 |
| CN | 202351953 A1 | 7/2012 |
| CN | 202394296 A1 | 8/2012 |
| CN | 102654927 A1 | 9/2012 |
| CN | 102682597 A | 9/2012 |
| CN | 102812500 A1 | 12/2012 |
| CN | 102930642 A1 | 2/2013 |
| CN | 102976004 A1 | 3/2013 |
| CN | 103198562 A1 | 7/2013 |
| CN | 103226870 A1 | 7/2013 |
| CN | 203242065 A1 | 10/2013 |
| CN | 103440607 A1 | 12/2013 |
| CN | 103514641 | 1/2014 |
| CN | 103544772 A1 | 1/2014 |
| CN | 203408902 A1 | 1/2014 |
| CN | 103662541 A1 | 3/2014 |
| CN | 103679147 A1 | 3/2014 |
| CN | 203520502 A1 | 4/2014 |
| CN | 103824387 A | 5/2014 |
| CN | 203858366 A1 | 5/2014 |
| CN | 103954626 | 7/2014 |
| CN | 105513201 A1 | 4/2016 |
| EP | 1168253 A1 | 1/2002 |
| EP | 1703436 A1 | 9/2006 |
| GB | 2167553 | 5/1986 |
| JP | 7112801 A1 | 5/1995 |
| JP | 7334583 A1 | 12/1995 |
| JP | H11242005 | 9/1999 |
| JP | 2000121564 A2 | 4/2000 |
| JP | 2000171409 A | 6/2000 |
| JP | 3123095 | 1/2001 |
| JP | 2002019147 A1 | 1/2002 |
| JP | 2002183286 A1 | 6/2002 |
| JP | 2002259528 A1 | 9/2002 |
| JP | 2002302252 A1 | 10/2002 |
| JP | 2002324264 A1 | 11/2002 |
| JP | 2002358354 A1 | 12/2002 |
| JP | 2003139516 A1 | 5/2003 |
| JP | 2003230229 | 8/2003 |
| JP | 2003242243 A1 | 8/2003 |
| JP | 2003264007 A1 | 9/2003 |
| JP | 2003267509 A1 | 9/2003 |
| JP | 2004021569 A1 | 1/2004 |
| JP | 2004191496 | 7/2004 |
| JP | 2004288143 A1 | 10/2004 |
| JP | 2004303102 A1 | 10/2004 |
| JP | 2004341681 A1 | 12/2004 |
| JP | 2005063203 | 3/2005 |
| JP | 2005122059 | 5/2005 |
| JP | 2005308476 | 11/2005 |
| JP | 2006127308 A1 | 5/2006 |
| JP | 2006195814 A1 | 7/2006 |
| JP | 2006203451 | 8/2006 |
| JP | 2006227764 A1 | 8/2006 |
| JP | 2006260246 A1 | 9/2006 |
| JP | 2007141266 A1 | 6/2007 |
| JP | 2007155455 | 6/2007 |
| JP | 2007179516 A1 | 7/2007 |

(56) References Cited

FOREIGN PATENT DOCUMENTS

| | | | |
|---|---|---|---|
| JP | 2007265340 A1 | 10/2007 |
| JP | 2008045959 | 2/2008 |
| JP | 2008522299 A1 | 6/2008 |
| JP | 2008293391 A1 | 12/2008 |
| JP | 2007086725 A1 | 4/2009 |
| JP | 2009175035 | 8/2009 |
| JP | 2009245058 A1 | 10/2009 |
| JP | 2009250971 A1 | 10/2009 |
| JP | 2009290852 | 12/2009 |
| JP | 2010177720 A1 | 8/2010 |
| JP | 2010276896 | 12/2010 |
| JP | 2011518387 | 6/2011 |
| JP | 20120504832 | 2/2012 |
| JP | 2012058932 A1 | 3/2012 |
| JP | 2013033361 A1 | 2/2013 |
| JP | 2013037441 A1 | 2/2013 |
| JP | 2013531823 A1 | 8/2013 |
| KR | 20000064168 A1 | 11/2000 |
| KR | 20010097567 | 11/2001 |
| KR | 100766860 | 10/2007 |
| KR | 20130085255 A1 | 7/2013 |
| KR | 20140037543 A1 | 3/2014 |
| WO | 115096 A1 | 3/2001 |
| WO | 205176 A1 | 1/2002 |
| WO | WO-225613 | 3/2002 |
| WO | 239357 A1 | 5/2002 |
| WO | 3012717 A1 | 2/2003 |
| WO | 3014994 A1 | 2/2003 |
| WO | 2004021114 A1 | 2/2004 |
| WO | 2004114490 A1 | 12/2004 |
| WO | 2005008566 A1 | 1/2005 |
| WO | 2005101346 A1 | 10/2005 |
| WO | 2006058601 A1 | 6/2006 |
| WO | 2006080851 A1 | 8/2006 |
| WO | WO-2007066166 | 6/2007 |
| WO | 9128176 A1 | 10/2009 |
| WO | 2009128173 A1 | 10/2009 |
| WO | 2009129526 A1 | 10/2009 |
| WO | 2010040116 A1 | 4/2010 |
| WO | 2010128267 A1 | 11/2010 |
| WO | 2010128315 A1 | 11/2010 |
| WO | 2011131016 A1 | 10/2011 |
| WO | 2012138679 A1 | 10/2012 |
| WO | 2013074819 A1 | 5/2013 |
| WO | WO-2013/063042 A1 | 5/2013 |
| WO | WO-2014075055 | 5/2014 |
| WO | 2015022409 A1 | 2/2015 |
| WO | 2017081527 A1 | 5/2017 |

OTHER PUBLICATIONS

Sheu, Jiuh-Biing, and Tsan-Ming Choi. "Extended consumer responsibility: Syncretic value-oriented pricing strategies for trade-in-for-upgrade programs." Transportation Research Part E: Logistics and Transportation Review 122 (2019): 350-367.*
Kanter, James Max, "Color Crack:Identifying Cracks in Glass," dated Dec. 9, 2014; retrieved from the internet http://www.jmaxkanter.com/static/papers/color_crack.pdf on Sep. 22, 2017.
Oliveira, et al., "Automatic crack detection on road imagery using anisotropic diffusion and region linkage," 18th European Signal Processing Conference (EUSIPCO-2010), Aug. 23, 2010, pp. 274-278.
Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.
Co-Pending U.S. Appl. No. 15/130,851 of Forutanpour, B. et al., filed Apr. 15, 2016.
Co-Pending U.S. Appl. No. 15/195,828 of Forutanpour, B. et al., filed Jun. 28, 2016.
Co-Pending U.S. Appl. No. 15/630,508 of Silva, J. et al., filed Jun. 22, 2017.
Co-Pending U.S. Appl. No. 15/630,539 of Bowles, M. et al., filed Jun. 22, 2017.
Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].
Dennis Bournique: "Mobile Karma Shuts Down as iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.
Tecace Software: "Your phone appraisal-Movaluate—Android Apps on Google Play", Android Apps on Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.
Co-Pending U.S. Appl. No. 15/855,320 of Forutanpour et al., filed Dec. 27, 2017.
2006 Florida Statutes Title XXXIII, Chapter 538, Sections 538.03 and 538.04, 7 pages.
Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.
Altec Lansing Users Guide 2007, 8 pages.
Bussiness Wire, "The World's First Office Photography Machine" at CES 2008 Launched by Ortery Technologies, Jan. 7, 2008, 3 pages.
CNET, "Tackling LCD "burn ins", and dead/stick Pixels", published Sep. 2, 2009, retrieved from http://www.cnet.com/news/tackling-lcd-burn-ins-and-deadstuck-pixels/.
Evgenii Masunov, Mar. 25, 2010, http://www.appleinsider.ru/news/ipone-obladaet-luchshim-tachskrinom-provereno_robotom.html, 4 pages.
Geekanoids, You Tube Video, "Apple iPhone 3GS Unboxing and Review", uploaded on Jun. 19, 2009, retrieved from http://www.youtube.com/watch?v=GCEi9QAeDqk on Sep. 2, 2009.
GSM Arena Glossary, "LCD (Liquid Crystal Display", retrieved from http://www.gsmarena.com/glossary.php3?term=lcd on Apr. 28, 2016, 1 page.
International Search Report and Written Opinion dated Mar. 3, 2016 in International Application No. PCT/US2015/065226, 11 pages.
Lambert, Emily, "Use It Up, Wear It Out", Forbes 175.5 (2005): 77-78. Business Source Complete. Web. Jan. 6, 2015, 3 pages.
Littleton Partners with Donations Ink (Jan. 19, 2006) US Fed News Service, Including US State News. Web. Jan. 6, 2015, 1 page.
MobileGazette.com, "2006 in Review: The Good, the Bad and the Ugly", published Dec. 2006, retrieved from http://www.mobilegazette.com/2006-review-06x12x22.htm on Nov. 11, 2015.
PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.
Perng et al., "A Novel Vision System for CRT Panel Auto-Inspection", Proceedings of the 2005 IEEE International Conference on Mechatronics, Jul. 10-12, 2005, pp. 4.
Perng et al., "A Novel Vision System for CRT PaNnel Auto-Inspection", Journal of the Chinese Institute of Industrial Engineers, vol. 24, No. 5, pp. 341-350 (2007).
Rawson, Chris, "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.
Rehg et al. "Vision for a Smart Kiosk" IEEE, Computer Society Conference on Computer Vision and Pattern Recognition (1997).
Rolf Steinhilper "Remanufacturing: The Ultimate Form of Recycling", Fraunhofer IRBVerlag, 1998, parts 1-3, http://www.reman.org/Publications_main.htm.
SimplySellular, "Get Cash for your Old Cell Phone", published Apr. 2, 2010, retrieved from http://simplysellular.com/conditions.php on Jan. 6, 2015, 2 pages.

(56) References Cited

OTHER PUBLICATIONS

Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Yahoo Answers, "What is a Clean ESN?" published Jun. 23, 2009, retrieved from http://web.archive.org/web/20090623215042/http://answers.yahoo.com/question/inde,8020US?qid=20080318061012AANFRco on Apr. 3, 2014.
Trading devices for dollars, The Economist (US) 405.8813:8 (US), Economist Intelligence Unit N.A. Incorporated, Dec. 1, 2012.
Turner, "5 MP3 Players for Pumping Up Your Workouts," Mashable.com, Nov. 4, 2010, available online at https://mashable.com/2010/11/04/mp3-players-for-sports/ (Year: 2010).
Non-Final Office Action dated Sep. 17, 2020 in U.S. Appl. No. 16/601,492, 24 pages.
International Numbering Plan, www.numberingplans.com, 2 pages.
RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.
Shotton et al., "Efficiently Combining Contour and Texture Cues for Object Recognition", Procedings of the British Machine Vision Conference 2008, (20080901), pp. 7.1-7.10 * abstract *.
Wiley Encyclopedia of Computer Science and Technology (2009).
International Search Report and Written Opinion dated Dec. 14, 2015 in International Application No. PCT/US2015/057802, 11 pages.
International Search Report and Written Opinion dated Jan. 12, 2016 in International Application No. PCT/US2015/059351, 11 pages.
International Search Report and Written Opinion dated Mar. 3, 2017 in International Application No. PCT/US2016/065801, 12 pages.
Non-Final Office Action Response filed Feb. 11, 2021 in U.S. Appl. No. 16/601,492, 18 pages.
Non-Final Office Action dated Jul. 26, 2018 in U.S. Appl. No. 14/925,357, 31 pages.
Non-Final Office Action Response filed Nov. 21, 2018 in U.S. Appl. No. 14/925,357, 20 pages.
Final Office Action dated Dec. 21, 2018 in U.S. Appl. No. 14/925,357, 34 pages.
Final Office Action Response filed Apr. 22, 2019 in U.S. Appl. No. 14/925,357, 18 pages.
Notice of Allowance dated May 20, 2019 in U.S. Appl. No. 14/925,357, 9 pages.
Non-Final Office Action dated Jul. 8, 2019 in U.S. Appl. No. 14/934,134, 57 pages.
Non-Final Office Action Response filed Nov. 8, 2019 in U.S. Appl. No. 14/934,134, 27 pages.
Final Office Action dated Jan. 29, 2020 in U.S. Appl. No. 14/934,134, 81 pages.
Final Office Action Response filed Jun. 29, 2020 in U.S. Appl. No. 14/934,134, 43 pages.
Notice of Allowance dated Aug. 3, 2020 in U.S. Appl. No. 14/934,134, 17 pages.
Notice of Allowance dated Sep. 10, 2020 in U.S. Appl. No. 14/934,134, 1 pages.
Non-Final Office Action dated Jul. 27, 2018 in U.S. Appl. No. 14/967,183, 19 pages.
Non-Final Office Action Response filed Jan. 28, 2019 in U.S. Appl. No. 14/967,183, 21 pages.
Final Office Action dated May 16, 2019 in U.S. Appl. No. 14/967,183, 25 pages.
Final Office Action Response filed Nov. 15, 2019 in U.S. Appl. No. 14/967,183, 21 pages.
Non-Final Office Action dated Jan. 10, 2020 in U.S. Appl. No. 14/967,183, 22 pages.
Appeal filed Aug. 11, 2020 in U.S. Appl. No. 14/967,183, 25 pages.
Examiner's Answer to Appeal Brief dated Sep. 16, 2020 in U.S. Appl. No. 14/967,183, 7 pages.
Appeal Reply filed Nov. 16, 2020 in U.S. Appl. No. 14/967,183, 8 pages.

* cited by examiner

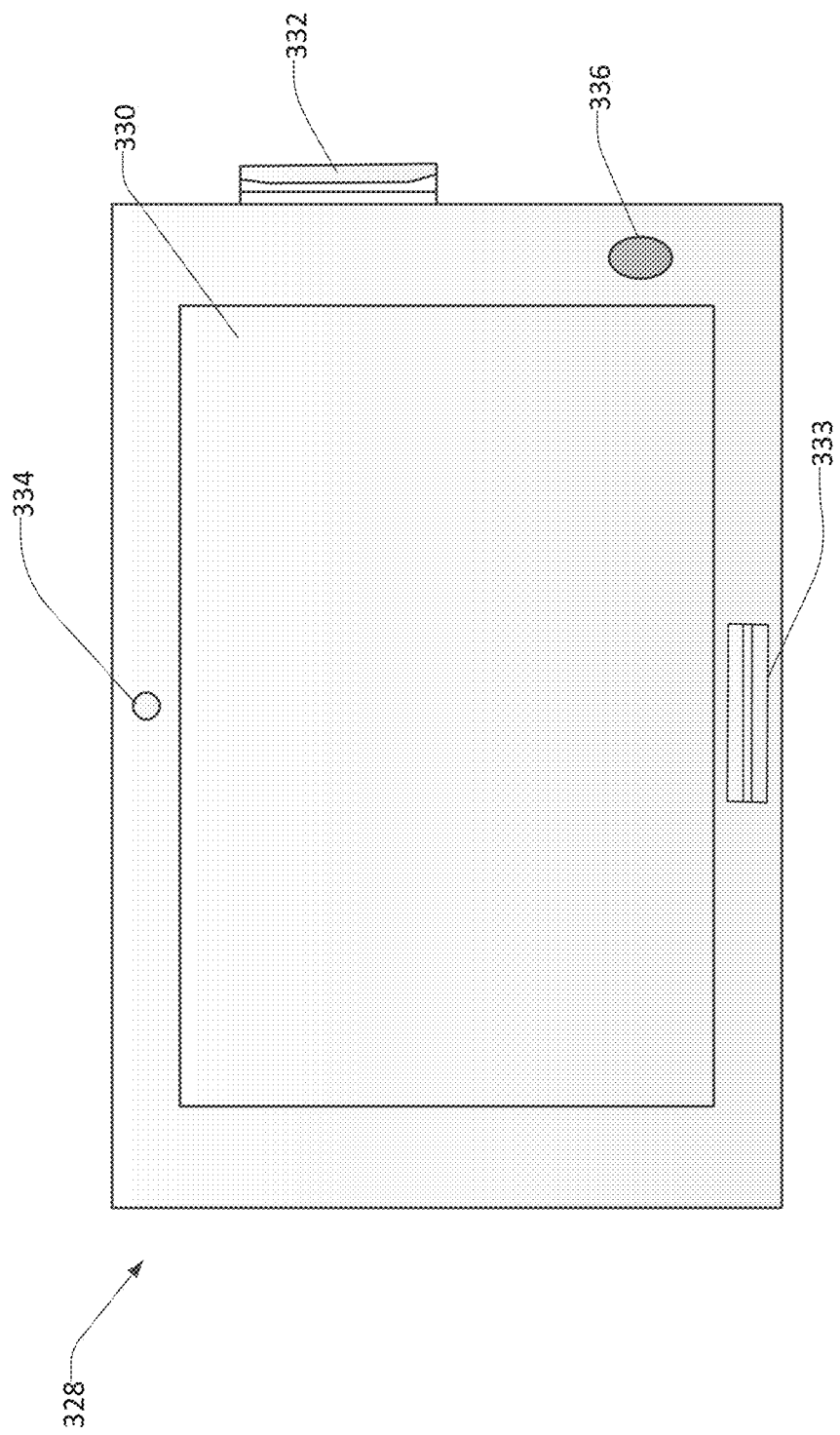

SYSTEMS AND METHODS FOR RECYCLING CONSUMER ELECTRONIC DEVICES

CROSS-REFERENCE TO RELATED APPLICATIONS

This application claims priority to U.S. Patent Provisional Application No. 62/091,426, titled "SYSTEMS AND METHODS FOR RECYCLING CONSUMER ELECTRONIC DEVICES" filed Dec. 12, 2014, and is incorporated herein by reference in its entirety.

TECHNICAL FIELD

The present disclosure is directed generally to systems and methods for recycling consumer electronic devices and, more particularly, to systems and methods for identification, evaluation, exchange, return, and/or purchase of consumer electronic devices.

BACKGROUND

Consumer electronic devices, such as mobile phones, laptop computers, notebooks, tablets, MP3 players, etc., are ubiquitous. Over 300 million desk-based and notebook computers shipped in 2013, and for the first time the number of tablet computers shipped exceeded laptops. In addition, there are over 6 billion mobile devices in use in the world; and the number of these devices is growing rapidly with more than 1.8 billion mobile phones being sold in 2013 alone. By 2017 it is expected that there will be more mobile devices in use than there are people on the planet. Part of the reason for the rapid growth in the number of mobile phones and other electronic devices is the rapid pace at which these devices evolve, and the increased usage of such devices in third world countries.

As a result of the rapid pace of development, a relatively high percentage of electronic devices are replaced every year as consumers continually upgrade their electronic devices to obtain the latest features. According to the U.S. Environmental Protection Agency, the U.S. alone disposes of over 370 million mobile phones, PDAs, tablets, and other electronic devices every year. Millions of other outdated or broken electronic devices are simply tossed into junk drawers or otherwise kept until a suitable disposal solution arises.

Although many electronic device retailers now offer mobile phone trade-in or buyback programs, many old devices still end up in landfills or are improperly disassembled and disposed of in developing countries. Unfortunately, however, electronic devices typically contain substances that can be harmful to the environment, such as arsenic, lithium, cadmium, copper, lead, mercury and zinc. If not properly disposed of, these toxic substances can seep into groundwater from decomposing landfills and contaminate the soil with potentiality harmful consequences for humans and the environment. As an alternative to retailer trade-in or buyback programs, consumers can now recycle and/or sell their used mobile phones using self-service kiosks located in malls or other publically accessible areas. Such kiosks are operated by ecoATM, Inc., the assignee of the present application, and are disclosed in, for example, U.S. Pat. Nos. 8,463,646, 8,423,404, 8,239,262, 8,200,533, 8,195,511, and 7,881,965, which are commonly owned by ecoATM, Inc. and are incorporated herein by reference in their entireties.

Certain retail establishments and other locations may be reluctant to provide a full-sized kiosk for recycling electronic devices due to the relatively large footprint of the kiosk. Accordingly, there continues to be a need for improving the means available to consumers for recycling or reselling mobile phones and other consumer electronic devices electronic devices. Simplifying the recycling/reselling process, enhancing the consumer experience, and discouraging fraud can incentivize consumers to dispose of their old electronic devices in an efficient and environmentally conscientious way.

BRIEF DESCRIPTION OF THE DRAWINGS

FIG. 3B illustrates a customer interface of the system shown in FIG. 3A.

DETAILED DESCRIPTION

Figure 1:
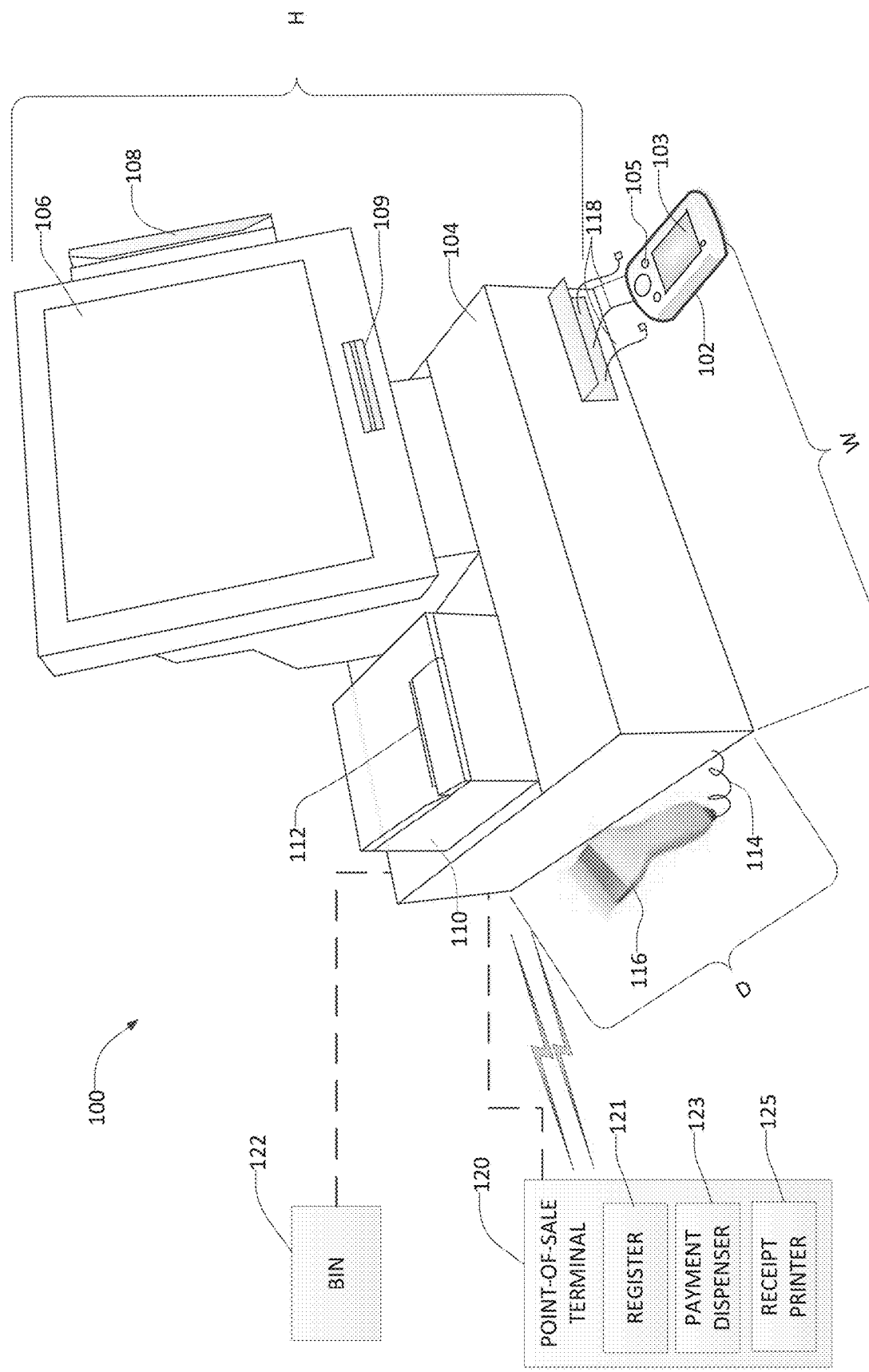
FIG. 1 is a perspective view of a system configured in accordance with an embodiment of the present technology for recycling electronic devices.

The following disclosure describes various embodiments of systems and methods for recycling and/or other processing of electronic devices. For example, the following describes various embodiments of systems comprising a compact device evaluation terminal which can be incorporated into or operably coupled with a point-of-sale terminal at a retail establishment for purchasing used mobile phones and/or other electronic devices from consumers at the retail location. Due to the compact form factor, such evaluation terminals can be utilized without sacrificing significant retail space.

The various embodiments of the systems described herein for recycling electronic devices can be particularly useful for retailers. For example, such systems may allow retailers to offer recycling of electronic devices without the need for specially trained staff members. Additionally, certain state and federal laws may provide incentives for retailers to participate in "takeback" programs that require manufacturers to assist with recycling of electronic devices. Manufacturers often offer warranties or other guarantees that may require receiving and evaluating electronic devices returned by customers. In some instances, retailers may offer buyback programs in order to promote sales of new products, for example offering a customer $50 towards the purchase of a new mobile phone if the customer brings in an old mobile phone for recycling. In these and other instances, the consumer's electronic device can be returned at a convenient location using various embodiments of the evaluation terminals described herein. These embodiments allow the electronic devices to be evaluated, inspected, binned, and compensation to be dispensed to the user. The retailer or other establishment hosting the recycling system may then coordinate with manufacturers or electronics recyclers to pick up the collected electronic devices.

Certain details are set forth in the following description and in FIGS. 1-6 to provide a thorough understanding of various embodiments of the present technology. In other instances, well-known structures, materials, operations and/or systems often associated with smartphones and other handheld devices, consumer electronic devices, computer hardware, software, and network systems, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is a schematic perspective view of system that includes an evaluation terminal 100 for recycling and/or other processing of mobile phones and/or other consumer electronic devices in accordance with embodiments of the present technology. The term "processing" is used herein for ease of reference to generally refer to all manner of services and operations that may be performed or facilitated by the system on, with, or otherwise in relation to an electronic device. Such services and operations can include, for example, purchasing, selling, reselling, recycling, donating, exchanging, identifying, evaluating, pricing, auctioning, decommissioning, transferring data from or to, reconfiguring, refurbishing, etc. mobile phones, laptops, personal computers, smart watches, and other electronic devices. Although many embodiments of the present technology are described herein in the context of mobile phones, aspects of the present technology are not limited to mobile phones and generally apply to other consumer electronic devices. Such devices include, as non-limiting examples, notebook and laptop computers, DVRs, e-readers, cameras, televisions, printers, desktop computers, game consoles, all manner of mobile phones, smart phones, handheld devices, PDAs, MP3 players, tablet, etc., as well smaller electronic devices such as Google Glass™, smartwatches (e.g., Apple Watch), other wearable computers, etc. Certain features of the evaluation terminal 100 can be at least generally similar in structure and function to certain features of the kiosks described in U.S. Pat. Nos. 8,463,646, 8,423,404, 8,239,262, 8,200,533, 8,195,511, and 7,881,965; and in U.S. patent application Ser. Nos. 12/573,089, 12/727,624, 13/113,497, 12/785,465, 13/017,560, 13/438,924, 13/753,539, 13/658,825, 13/733,984, 13/705,252, 13/487,299, 13/492,835, 13/562,292, 13/658,828, 13/693,032, 13/792,030, 13/794,814, 13/794,816, 13/862,395 and 13/913,408. All of the patents and patent applications listed in the preceding sentence are commonly owned by the applicant of the present application, and they along with any other patents or patent applications identified herein are incorporated herein by reference in their entireties. The disclosed technology also includes U.S. patent application Ser. No. 14/498,763, titled "METHODS AND SYSTEMS FOR PRICING AND PERFORMING OTHER PROCESSES ASSOCIATED WITH RECYCLING MOBILE PHONES AND OTHER ELECTRONIC DEVICES," filed by the applicant on Sep. 26, 2014; U.S. patent application Ser. No. 14/500,739, titled "MAINTAINING SETS OF CABLE COMPONENTS USED FOR WIRED ANALYSIS, CHARGING, OR OTHER INTERACTION WITH PORTABLE ELECTRONIC DEVICES," filed by the applicant on Sep. 29, 2014; U.S. provisional application No. 62/059,129, titled "WIRELESS-ENABLED KIOSK FOR RECYCLING CONSUMER DEVICES," filed by the applicant on Oct. 2, 2014; U.S. provisional application No. 62/059,132, titled "APPLICATION FOR DEVICE EVALUATION AND OTHER PROCESSES ASSOCIATED WITH DEVICE RECYCLING," filed by the applicant on Oct. 2, 2014; U.S. patent application Ser. No. 14/506,449, titled "SYSTEM FOR ELECTRICALLY TESTING MOBILE DEVICES AT A CONSUMER-OPERATED KIOSK, AND ASSOCIATED DEVICES AND METHODS," filed by the applicant on Oct. 3, 2014; U.S. provisional application No. 62/073,840, titled "SYSTEMS AND METHODS FOR RECYCLING CONSUMER ELECTRONIC DEVICES," filed by the applicant on Oct. 31, 2014; U.S. provisional application No. 62/073,847, titled "METHODS AND SYSTEMS FOR FACILITATING PROCESSES ASSOCIATED WITH INSURANCE SERVICES AND/OR OTHER SERVICES FOR ELECTRONIC DEVICES," filed by the applicant on Oct. 31, 2014; and U.S. provisional application No. 62/076,437, titled "METHODS AND SYSTEMS FOR EVALUATING AND RECYCLING ELECTRONIC DEVICES," filed by the applicant on Nov. 6, 2014. All of the patents and patent applications listed in the preceding sentence are commonly owned by the applicant of the present application, and they along with any other patents or patent applications identified herein are incorporated herein by reference in their entireties.

In the illustrated embodiment, the evaluation terminal 100 is a counter-top apparatus configured for use by a user (e.g., a clerk, retail assistant, consumer, customer, etc.) to recycle, sell, return and/or perform other operations with a consumer electronic device 102 (e.g., a smartphone) in, for example, a store, mall, or other retail establishment. In other embodiments, the evaluation terminal 100 can be configured for use as a floor-mounted or wall-mounted apparatus. Although embodiments of the evaluation terminal 100 can be configured for use by retail clerks or other store employees, in various embodiments the evaluation terminal 100 and/or various portions thereof can also be used entirely or in part by other operators, such as customers or consumers to facilitate the selling or other processing of mobile phones, laptops, smart watches, and other electronic devices.

In the illustrated embodiment, the evaluation terminal 100 includes a housing 104 that can be of conventional manufacture from, for example, sheet metal, plastic panels, etc. In some embodiments, the evaluation terminal 100 can have a relatively small form factor. For example, the housing 104 can define a footprint having a width W and a depth D, and the evaluation terminal 100 can have a height H. In some embodiments, the width W can be between about 6 inches and about 3 feet, or between about 6 inches and about 2 feet, and the depth D can be between about 6 inches and about 2 feet, or between about 8 inches and about 18 inches. In other embodiments, the width W and the depth D can each be less than about 1 foot. In some embodiments, the total volume of the housing can be less than about 3 cubic feet, less than about 2 cubic feet, or less than about 1 cubic foot. In some embodiments, the height H can be less than about 3 feet, less than about 2 feet, or less than about 1 foot. In other embodiments, the evaluation terminal 100 can have other shapes, sizes, and/or form factors. A plurality of user interface devices are provided on an exterior (e.g., front portion) of the housing 104 for providing instructions and other information to users, and/or for receiving user inputs and other information from users. For example, the evaluation terminal 100 can include a display screen 106 (e.g., a liquid crystal display (LCD)) for providing information, prompts, etc. to users via text, graphics, video, etc. The display screen 106 can include a touch screen for receiving user inputs and responses to displayed prompts. In addition or alternatively, the evaluation terminal 100 can include a separate keyboard or keypad for this purpose. The evaluation terminal 100 can also include a card reader 108 for reading, e.g., magnetic stripes, optical media, etc. on credit cards, bankcards, etc. (e.g., a card swipe and/or credit card reader). An ID card reader 109 is also provided for reading driver's licenses and/or other personal identification cards. The evaluation terminal 100 can additionally include a plurality of output devices such as a printer 110 having an associated outlet 112. The printer 110 can be configured to print receipts, vouchers, and/or labels. The evaluation terminal 100 can further include a scanner 114 which can be, for example, a handheld barcode scanner. In some embodiments, the scanner can be a linear barcode reader, a QR code reader, an NFC reader, or other optical or electrical scanning device for scanning and/or reading various forms of machine-readable indicia. In the illustrated embodiment, the scanner 114 is tethered to the evaluation terminal by a cord 116, allowing the user to manually operate the scanner to read a barcode or other indicia on the electronic device 102. In other embodiments, the scanner 114 can be rigidly fixed to the evaluation terminal 100, or in other embodiments the scanner may be physically separated from the evaluation terminal 100 and may wirelessly communicate with the evaluation terminal 100. Unless otherwise noted herein, the card reader 108, the ID card reader 109, the printer 110, the outlet 112, the scanner 114, and the cord 116 described above can be of conventional manufacture and operation as known to those having ordinary skill in the art.

In the illustrated embodiment, the evaluation terminal 100 further includes a plurality of electrical connectors 118 extending from the housing 104 that are configured to connect to a wide variety of mobile phones and other consumer electronic devices. The connectors 118 can include, for example USB connectors, micro-USB connectors, Lightning connectors, FireWire connectors, etc. for temporary connection to electronic devices that can be received by the evaluation terminal 100, such as mobile phones, laptops, printers, smart watches, etc. The electrical connectors 118 can additionally include an AC plug to provide power for certain devices, e.g., desktop computers, televisions, printers, game consoles, etc.

In some embodiments, the evaluation terminal 100 may not be integrated with any existing point-of-sale software of a retailer, but the evaluation terminal 100 may nonetheless run on the same computing hardware as the point-of-sale software. In the illustrated embodiment, for example, the evaluation terminal 100 can be operably connected to, but separate from, an existing point-of-sale terminal 120 in the retail establishment. The point-of-sale terminal 120 can include, for example, a conventional register 121, a cash drawer or payment dispenser 123, a receipt printer 125, etc. The evaluation terminal 100 can be positioned adjacent to the point-of-sale terminal 120 or remote therefrom. The evaluation terminal 100 can be electrically connected (e.g., wirelessly or via a wired connection) to the point-of-sale terminal 120 and may share computing resources with the point-of-sale terminal 120. In other embodiments described in detail below, the evaluation terminal 100 can also serve as a conventional point-of-sale terminal in a retail establishment. In these embodiments, the evaluation terminal 100 can be integrated with the point-of-sale software of the retailer. Additionally, in these embodiments the evaluation terminal 100 can further include a payment dispenser (not shown) for dispensing payment to a customer. In some embodiments, the payment dispenser can be a cash drawer, a card dispenser (e.g., to dispense gift cards with stored value), a voucher printer, an electronic payment device (e.g., a terminal for making electronic wire transfers, Paypal transfers, Bitcoin transfers, etc.), etc.

The evaluation terminal 100 can also be associated with a secure storage bin 122 or other collection station or facility for receiving the electronic devices from customers for secure storage, trade-ins, and/or further processing and recycling. In some embodiments, the bin 122 can be remote from the evaluation terminal 100; for example the bin can be positioned in another location within a store, a warehouse, etc. In other embodiments, the bin 122 can be proximate to the evaluation terminal 100, for example the bin 122 can be located beneath the evaluation terminal 100. In some embodiments, the bin 122 can be coupled with a scanner or other reader which can read the identifying labels affixed to electronic devices to identify and record the devices as they are deposited into and/or removed from the bin.

Although not identified in FIG. 1, the evaluation terminal 100 can further include a speaker and/or a headphone jack for audibly communicating information to operators, one or more lights for visually communicating signals or other information to users, a handset or microphone for receiving verbal input from the user, as well as other user input and output devices. The input devices may include a touchpad, a pointing device such as a mouse, a joystick, pen, game pad, motion sensor, scanner, bag/package dispenser, a digital signature pad, etc. The evaluation terminal 100 can include a network connection to receive updates for pricing, grading algorithms, second-hand dealer (SHD) compliance features, etc. In some embodiments, the evaluation terminal 100 can additionally include a camera for capturing images of a customer, a biometric scanner, and/or other features to facilitate identity evaluation and fraud detection.

As one example of a recycling process using the evaluation terminal 100, a customer can approach the terminal with an electronic device 102, such as a mobile phone, to be recycled. As noted above, the electronic device can take various other forms, such as a laptop, game console, tablet, wearable computing device, etc. In some embodiments, the customer can hand the electronic device 102 to a clerk at the evaluation terminal 100. The clerk can receive the electronic device 102 and proceed with identification and evaluation. Identification and evaluation of the electronic device 102 can be used to determine a price to offer the customer in exchange for the electronic device 102. In various embodiments, the identification and evaluation process can include electrical analysis of the electronic device 102 by the evaluation terminal 100. In some embodiments, the clerk may initiate the evaluation by interacting with display screen 106 on the evaluation terminal 100. For example, the clerk can indicate the type of device provided by the customer by responding (via, e.g., a touch screen) to a menu and/or prompts on the display screen 106. Next, the clerk may be prompted to remove any cases, stickers, or other accessories from the device 102 so that it can be accurately evaluated. The clerk may also be prompted to plug an appropriate one or more of the electronic connectors 118 into the corresponding port (e.g., a USB port) on the electronic device 102. If needed, the clerk may also plug a suitable power cord for the electronic device 102 into an AC outlet. After connecting the electronic device 102 to one of the electronic connectors 118, the evaluation terminal 100 performs an electrical inspection to confirm the identity and further evaluate the condition of the electronic device 102 as well as specific component and operating parameters such as memory, processor, make, model, etc. In addition or alternatively, in some embodiments the electrical inspection can include a determination of phone manufacturer information (e.g., a vendor identification number or VID) and product information (e.g., a product identification number or PID), and/or determination of the International Mobile Station Equipment Identity (IMEI) number or Mobile Equipment Identifier (MEID) number associated with the device 102. In some embodiments, the electrical analysis can be performed wirelessly, for example via software installed on the electronic device 102 for remote analysis. In some embodiments, the evaluation terminal 100 can perform the electrical analysis using one or more of the methods and/or systems described in detail in the commonly owned patents and patent applications identified herein and incorporated by reference in their entireties. For example, embodiments of electrical analyses that can be performed by and/or with the evaluation terminal 100 are disclosed in commonly owned U.S. provisional application No. 62/076,437, titled "METHODS AND SYSTEMS FOR EVALUATING AND RECYCLING ELECTRONIC DEVICES," which was filed by the applicant on Nov. 6, 2014 and which is incorporated herein by reference in its entirety.

In some embodiments, the electrical analysis can include evaluating the condition and/or functionality of the charging circuit of the electronic device 102. In particular, the testing electronics measure the amount of charge current that the charging circuit draws on the power lines, and the testing electronics use the corresponding current measurement signal to determine whether the charging circuit is functional or damaged. In general, charging circuits can become damaged by statistic discharge or when they are overheated, exposed to water, or connected to a non-standard power supply. If a charging circuit is damaged, it might not regulate charge current properly (if at all), which can cause damage to a battery. For example, a damaged charging circuit might have a slow charge rate or a very rapid charge rate. In many cases, a charging circuit is difficult and expensive, if not impossible, to replace because it is typically located on a primary circuit board or co-located on a processor chip. Thus, an electronic device 102 with a damaged charging circuit may have little market value due to the impracticability of replacing the charging circuit.

In some embodiments, the electrical analysis can include detecting whether a charging circuit is damaged by determining if the current is below a maximum current threshold, above a minimum current threshold, or within a range that falls between the maximum and minimum current thresholds. The testing electronics can also measure other types of electrical quantities associated with the charge current, such as AC frequency or DC pulse widths. For example, in some mobile devices, the charge current may begin to pulse when the battery is fully charged. In an additional or alternate embodiment, the testing electronics can apply an AC test voltage to test capacitors, transistors, or other reactive circuit elements of mobile device hardware.

In some embodiments, the current measurement signal can be compared to reference quantities corresponding to the electrical characteristics of a particular make and/or model of an electronic device 102. For example, the routine can include looking up device signatures in a look-up table stored in memory. The reference quantities in the device signature can include, for example, the charge current thresholds, the amount of power that the device is supposed to draw on the power line, the expected impedance between the power line and circuit ground, and/or other known reference quantities associated with particular types of makes and/or model of mobile devices.

In some embodiments, the evaluation terminal 100 can operate via the electrical connectors 118 in a manner similar to that of a USB host device. For example, the evaluation terminal 100 can assign a unique address to the electronic device and exchange USB packets directly with the electronic device 102. For example, in one embodiment the evaluation terminal 100 can request USB device descriptors from the electronic device 102. In some embodiments, the evaluation terminal 100 can communicate via the electrical connector 118 directly with a processor of the electronic device 102 to access the device's hardware components over a debugging interface, such as the android debugging bridge (ADB) or over a hardware abstraction interface. In one embodiment, the evaluation terminal 100 can use such interfaces to operate (e.g., activate, access, control, enable, and/or disable) hardware components, such as the electronic device's camera, display, memory, vibrator motor(s), etc. For example, the evaluation terminal 100 can use a software interface to access the electronic device's memory to retrieve an image and display the image on the device's display screen, if applicable. In another embodiment, the evaluation terminal 100 can communicate with a so-called smart charging circuit, which has logic that enables the charging circuit to be turned on or off and/or to draw different levels of charge current. The evaluation terminal 100 can also use shell access to identify hardware on the electronic device 102. For example, the evaluation terminal 100 can use shell access to detect any non-OEM hardware that may have been installed on the electronic device 102.

Following the electrical evaluation, in some embodiments the clerk may be prompted to utilize the scanner 114 to scan a barcode on the electronic device 102, or to manually enter a serial number or similar identifying number or feature associated with the electronic device 102. For example, in some electronic devices the serial number or similar identifying number may be visible on an external surface (e.g., displayed on a bottom surface, under a battery, etc.). In some embodiments, a barcode could be included on the electronic device 102 in such a way that the barcode is invisible to the user, but is readable via infrared or ultraviolet light. In some electronic devices, a clerk can navigate an operating system of the electronic device 102 to obtain the serial number or other identifying number. In some embodiments, evaluation of the electronic device 102 can involve user (e.g., clerk) interaction. For example, once the electronic device 102 is connected to one of the electrical connectors 118, the evaluation terminal 100 can electronically communicate with the electronic device via the electrical connector 118, including, for example, instructing the electronic device 102 to start up and run a program or app. The clerk may then be instructed to answer prompts on the screen 103 of the electronic device 102. For example, a message may be displayed on the screen 103 asking the clerk to enter a certain set of characters (e.g., via a touch screen 103 or a keyboard 105 of the electronic device 102). If the clerk correctly enters these characters, then it can be inferred that the screen and/or the keyboard of the electronic device 102 are operative. In some embodiments, the evaluation terminal 100 invokes a message on the screen 103 of the electronic device 102 to be recycled. If the clerk is able to read the message it indicates that the display is functional. If the clerk is then able to use the touch screen 103 or keyboard 105 to reply it indicates that those inputs are also functional. In some embodiments, the clerk interaction with the electronic device 102 can also yield additional information, for example information obtained from the system file of the device 102.

In some embodiments, the clerk can visually inspect the electronic device 102. For example, the clerk may identify any cracks, scratches, dead pixels, or other damage to the electronic device 102. In some embodiments, the clerk can provide a grade for the electronic device 102 based on the visual inspection (e.g., "poor", "fair", "good", and "excellent" grades, etc.). This grade can be input to the evaluation terminal 100, for example via interaction with a touch screen associated with the display screen 106.

After the electrical evaluation and/or the visual evaluation of the device 102, the evaluation terminal 100 determines a compensation amount for the electronic device 102. Based on the identification and evaluation of the electronic device 102, the evaluation terminal 100 can determine an estimated price or an estimated range of prices to offer to the customer for the device 102. In some embodiments, the evaluation terminal 100 may query a database comprising a lookup table with various prices for a range of identified electronic devices depending on their evaluated conditions. As one example, the lookup table may indicate that for a particular smartphone make and model, three different prices are available depending on the determined condition (e.g., poor condition—$100, fair condition—$200, good condition—$300). The evaluation terminal 100 may grade the condition of the smartphone automatically based on the visual and/or electrical inspection. Based on the graded condition of the electronic device 102, the evaluation terminal 100 may query the database and receive a compensation amount to be offered to the customer. In some embodiments, the price may not depend on the condition of the electronic device, but only on the make and model. Additional details relating to processes for determining the price for an electronic device are disclosed in commonly owned U.S. patent application Ser. No. 14/498,763, titled METHODS AND SYSTEMS FOR PRICING AND PERFORMING OTHER PROCESSES ASSOCIATED WITH RECYCLING MOBILE PHONES AND OTHER ELECTRONIC DEVICES, which was filed Sep. 26, 2014, which is incorporated herein by reference in its entirety.

In some embodiments, determining the compensation amount (purchase price) includes determining whether any specific promotions and/or additional rewards or rebates from the retailer, manufacturer of the device, or any other entity are associated with the electronic device. For example, if mobile phones of a certain brand are eligible for an advertised store credit amount upon trade-in, the evaluation terminal 100 can determine whether the electronic device 102 is eligible and, if so, notify the customer. This can be particularly valuable for retailers who desire to provide a broad spectrum of different promotions for trade-in or trade-up programs to incentivize recycling but face the difficulty for store staff to correctly identify so many different makes and models of different devices, as well as remembering a long list of specific promotions for each. In some embodiments, various options for the compensation can be determined, for example $50 in cash or $100 in store credit towards the purchase of a new device. For example, the evaluation terminal 100 may query a database to determine the price for a particular electronic device based on the evaluated condition. In some embodiments, the database can include a lookup table that includes, in addition to a monetary amount, any applicable rebates, specific promotions, etc. For example, the lookup table may indicate that for a particular identified electronic device having an evaluated condition of "fair" or "good", the price can be either $50 in cash or $100 in store credit towards the purchase of a new laptop. Various other promotions, rebates, coupons, and other promotions can be stored in the lookup table. Accordingly, the evaluation terminal 100 may offer a customer a variety of compensation amounts, whether cash, trade-in value, discount coupons, or otherwise, based on the identification and evaluation of the electronic device.

The determined price or other compensation offers can be presented to the customer. For example, the display screen 106 may display the price, which can be shown to the customer. In another embodiment, the display screen 106 may display the determined price, and the clerk may verbally or otherwise communicate the price to the customer. If the customer declines the offer, then the clerk can disconnect the electronic device 102 from the electrical connector 118 and return the device 102 to the customer. If the customer accepts the offer (e.g., by orally communicating with the clerk, by signing or otherwise acknowledging receipt via digital signature pad, touch screen, etc.), then the evaluation terminal 100 can print an identifying label via printer 110 and outlet 112, which can then be affixed to the electronic device 102. For example, the evaluation terminal 100 may print and dispense a unique identification label (e.g., a small adhesive-backed sticker with a QR code, barcode, etc.) from the label outlet 112 for the clerk to adhere to the electronic device 102. In some embodiments, the printed label can include the obtained information about the electronic device 102, for example its make, model, serial number, condition, its determined value, related promotions, etc. In some embodiments, the identifying label can include machine-readable indicia associated with the identified electronic device. For example, the label can include a barcode, QR code, or other machine-readable indicia that, when scanned, retrieves the obtained information about the electronic device. In some embodiments, additional information obtained from other databases can be obtained upon reading the machine-readable indicia, including any applicable takeback offers, rebates, coupons, etc. The clerk can also verify the customer's identity by scanning his or her identification card (e.g., driver's license, passport, etc.) with the card reader 108. In some embodiments, the label can be scanned at the point-of-sale terminal 120 prior to dispensing compensation to the user. For example, in some embodiments the point-of-sale terminal 120 can display the device information to the clerk (e.g., via a display screen), and the clerk can visually inspect the electronic device 102 and compare it to the information provided on the display screen to determine whether the device presented by the customer matches the make, model, and other information presented on the display screen. This feature can preclude one type of abuse in which a customer has one device evaluated at the evaluation terminal 100, and then attempts to provide a different device of lesser value to the clerk at the point-of-sale terminal 120 for payment.

After affixing the label to the electronic device 102, the clerk can store the electronic device in a secure repository, for example in the bin 122. As noted above, in some embodiments the bin 122 can be remote from the evaluation terminal 100, for example the bin 122 can be positioned in another location within a store. In some embodiments, the bin 122 can be proximate to the evaluation terminal 100, for example the bin 122 can be positioned beneath the evaluation terminal 100. In some embodiments, the electronic device 102 can be added, either automatically or manually by the clerk, to an inventory database before or when it is placed in the bin 122. The database can be networked to other inventories, manufacturers, resellers, etc. For example, a database may be maintained that includes, for a particular device, the make, model, quantity of such devices in a particular bin 122 and/or in other facilities at remote locations, compensation amount(s) paid to customers for such devices, customers demographic information, and other information. The database can be periodically updated as new devices are purchased from customers and devices are retained in the bin 122. The inventory database can also be used to facilitate recycling of the devices. For example, a retailer may be able to contact an electronics recycler and easily provide information regarding the number and type of devices in the inventory. Pick-up may be scheduled based on volume and/or time from the selected collection agency, and the collection agency would be prepared with a complete list of what inventory to expect. This inventory database can additionally provide valuable information regarding which manufacturers and models are being recycled, optionally cross-referenced with customers demographic data. Further, the inventory data can be useful to retailers to demonstrate compliance with state and federal regulations regarding electronics recycling and takeback programs.

After binning the electronic device 102, the clerk may dispense compensation to the customer from, e.g., the point-of-sale terminal 120. In some embodiments, payment can be made in the form of cash, a redeemable voucher, a coupon, a discount on another device, an e-certificate, a prepaid card, a wired or wireless monetary deposit to an electronic account (e.g., a bank account, credit account, loyalty account, online commerce account, mobile wallet, etc.), Bitcoin, etc. In some embodiments, the evaluation terminal 100 can automatically fill out any forms of paperwork necessary for the customer to obtain a refund, rebate, or other compensation from the manufacturer or other entity. The completed forms can be provided to the customer for submission or may be submitted automatically on behalf of the customer.

Figures 2A, 2B:
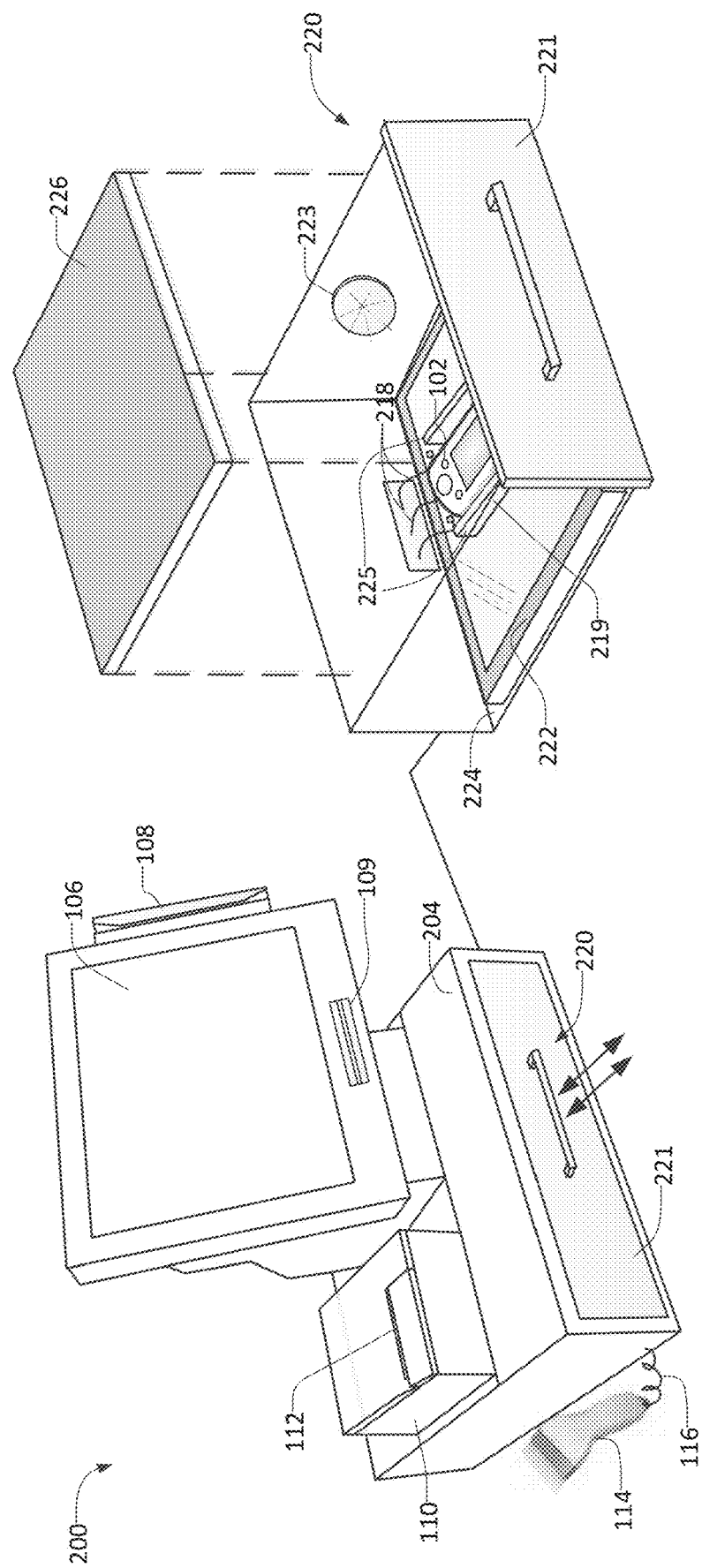
FIG. 2A is a perspective view of another system configured in accordance with an embodiment of the present technology for recycling electronic devices.
FIG. 2B is an enlarged detail view of an inspection area of the system shown in FIG. 2A.

FIG. 2A is a schematic perspective view of a system for recycling and/or other processing of mobile phones and other consumer electronic devices in accordance with the present technology. The system includes an evaluation terminal 200 that is generally similar in structure and function in some respects to the evaluation terminal 100 described above in FIG. 1. As in FIG. 1, for example, the evaluation terminal 200 includes a housing 204, the display screen 106 (which may include a touch screen), the card reader 108 (e.g., a credit card reader, etc.), the ID card reader 109, the printer 110 having the outlet 112 (e.g., for printing vouchers, receipts, labels, etc.), and the scanner 114 (e.g., barcode scanner) coupled to the terminal 200 via the cord 116. The evaluation terminal 200 can also be associated with a bin or other collection station or facility for receiving the electronic devices from customers for secure storage, trade-ins, and/or further processing and recycling. In some embodiments, the evaluation terminal 200 can also serve as a conventional point-of-sale terminal in a retail establishment. In these embodiments, the evaluation terminal 200 can be integrated with the point-of-sale software of the retailer and can include, for example, a cash drawer or other payment dispenser (not shown) for dispensing payment to a customer for the used electronic device 102.

Whereas the evaluation terminal 100 of FIG. 1 includes electrical connectors 118 that are accessible from outside the housing 104, the evaluation terminal 200 includes an enclosable inspection area 220 configured as a drawer 221 within the housing 104. The inspection area 220 is illustrated in greater detail in FIG. 2B. As illustrated in FIG. 2B, the inspection area 220 includes a plurality of electrical connectors 218 which can include, for example, USB connectors, micro-USB connectors, Lightning connectors, FireWire connectors, etc. for temporary connection to the electronic device 102, such as a mobile phone, when the electronic device 102 is positioned within the inspection area 220, such as a mobile phone. The inspection area 220 can also be configured to receive other electronic devices, such as laptops, smart watches, etc. that can be connected to one or more of the electrical connectors 218. The electrical connectors 218 can additionally include a power connector, such as an AC plug, to provide power for certain devices, e.g., printers, game consoles, etc. An adjustable fixture or cradle 219 can be sized and configured to receive the electronic device 102 in the inspection area 220. The cradle 219 can be adjustable, for example, guide portions 225 can be slidable to accommodate electronic devices having various widths.

In the illustrated embodiments, the inspection area 220 comprises a first imaging component 222 disposed on or proximate a lower surface 224 of the inspection area 220. The first imaging component 222 can be or include, for example, a flatbed scanner or other imaging system (e.g., a digital camera) capable of capturing images of the electronic device 102. A second imaging component 226 can be disposed within the evaluation terminal 200 at a position above the inspection area 220 when the drawer 221 is closed and the inspection area 220 is disposed within the housing 104. For example, when the drawer 221 is closed, the second imaging component 226 can be substantially aligned over the first imaging component 222. The second imaging component 226 can be or include, for example, a flatbed scanner or other imaging system (e.g., a digital camera, etc.) capable of capturing images of the electronic device 102. Together, the first imaging component 222 and the second imaging component 226 can capture images of opposite sides (e.g., top and bottom sides or surfaces) of the electronic device 102 when the device is positioned within the inspection area 220. In some embodiments, one or more appropriately positioned/angled mirrors (not shown) may also be disposed about the inspection area 220 to facilitate imaging of other portions of an electronic device 102, such as side surfaces. In some embodiments more or fewer imaging components can be provided within the evaluation terminal 200. One or more optional light source 223 (e.g., LED, fluorescent bulb, etc.) can be disposed within the inspection area 220, and can be configured to illuminate the electronic device 102 to facilitate imaging by the imaging components 222 and 226.

As one example of a recycling process using the evaluation terminal 200, a customer can approach the terminal with the electronic device 102 to be recycled, such as a mobile phone. This process can be similar in some respects to that described above with respect to FIG. 1. For example, a clerk can receive the customer's electronic device 102 and place it in, e.g., the cradle 219 or other fixture for proper orientation within the inspection area 220, and connect the electronic device 102 to one of the electrical connectors 218. Electrical identification and evaluation of the electronic device 102 can proceed as described above with reference to FIG. 1. However, the inspection area 220 further enables automated visual inspection and evaluation of the electronic device by way of the first imaging component 222 and the second imaging component 226.

In some embodiments, the first and second imaging components 222, 226 can be configured to obtain a serial number or similar identifying number that may be visible on an external surface of the electronic device 102. For example, in some embodiments, the electronic device 102 can include a barcode on an external surface that is invisible to the user, but is readable via infrared or ultraviolet light. In some embodiments, one or both of the imaging components 222, 226 can include an infrared light source and/or an infrared reader configured to detecting barcodes or other indicia on the electronic device 102. The evaluation terminal 200 can also identify and inspect the device by analyzing images obtained via the imaging components 222, 226. For example, in some embodiments, the visual inspection can include a 3D visual analysis to determine the size of the device 102 and confirm the identification of the electronic device 102 (e.g. make and model) based on size, and/or to evaluate or assess the condition and/or function of the electronic device 102 and/or its various components and systems. In some embodiments, the visual inspection can include a computer-implemented visual analysis (e.g., a three-dimensional ("3D") analysis) performed by a processor within the evaluation terminal 200 (e.g., a CPU) to confirm the identification of the electronic device 102 (e.g. make, model and/or sub-model) and/or to evaluate or assess the condition and/or function of the electronic device 102 and/or its various components and systems. For example, the visual analysis can include computer-implemented evaluation (e.g., a digital comparison) of images of the electronic device 102 taken by the imaging components 222, 226 from top, side and/or end view perspectives to determine length, width, and/or height (thickness) dimensions of the electronic device 102. This comparison can include, for example, counting pixels along various dimensions in each image. In some embodiments, the visual analysis can include an inspection of a display screen on the electronic device 102 for cracks or other damage. In various embodiments, the evaluation terminal 200 can perform the visual analysis using one or more of the methods and/or systems described in detail in the commonly owned patents and patent applications identified herein and incorporated by reference in their entireties.

After visual and electrical inspection and evaluation of the electronic device 102, the process can continue as outlined above with respect to FIG. 1. For example, an offer price for the electronic device 102 can be determined and offered to the customer. If the customer accepts the offer price, a corresponding label can be printed and dispensed from the outlet 112 and affixed to the electronic device 102, compensation can be dispensed to the customer, and the electronic device 102 can be binned.

Figure 3A:
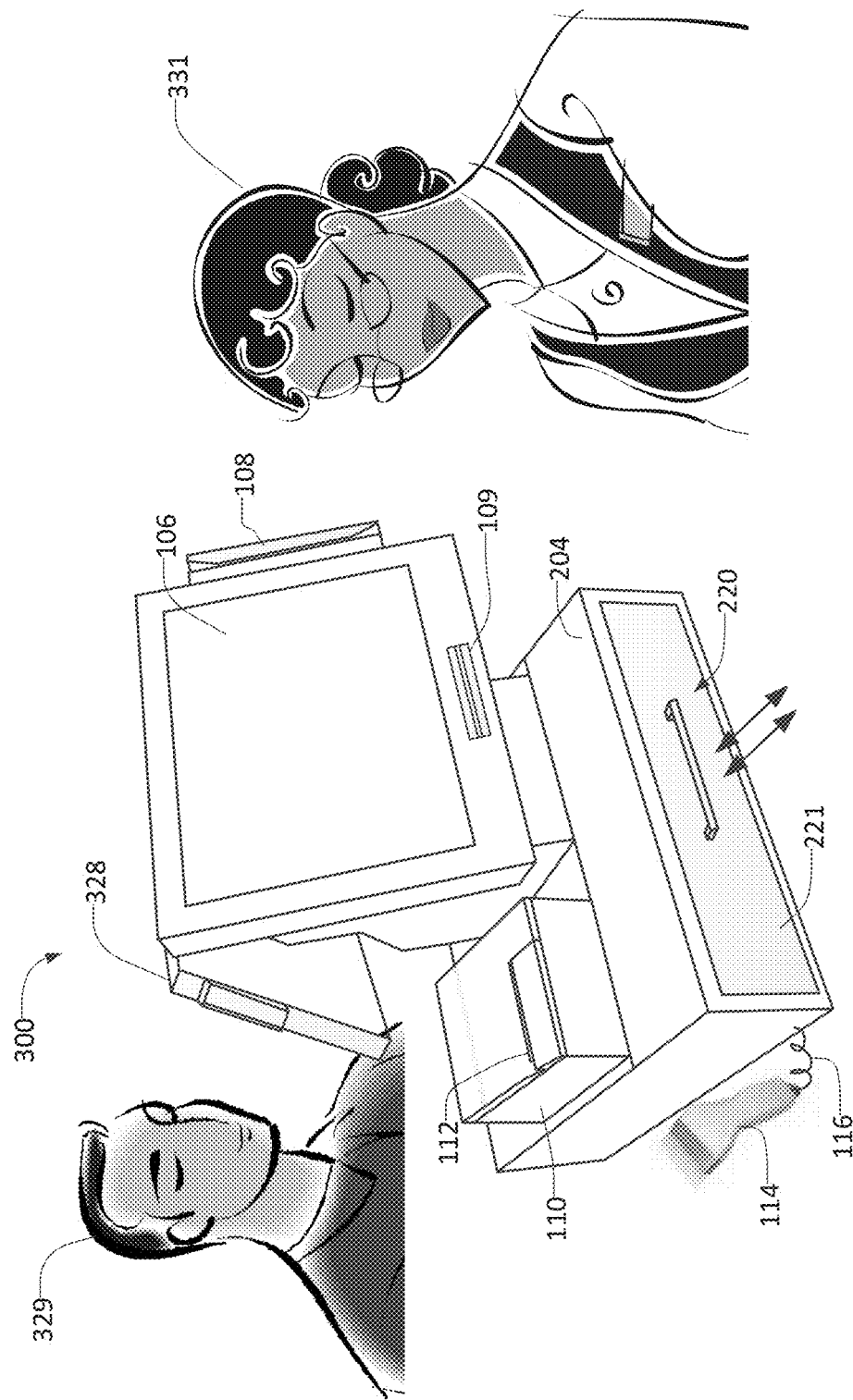
FIG. 3A is a perspective view of another system configured in accordance with an embodiment of the present technology for recycling electronic devices.

FIG. 3A is a schematic perspective view of another system for recycling and/or other processing of mobile phones and other consumer electronic devices in accordance with embodiments of the present technology. The system includes an evaluation terminal 300 that can be generally similar in structure and function in some respects to the evaluation terminal 100 described above with respect to FIG. 1 and the evaluation terminal 200 described above with respect to FIGS. 2A-B. For example, the evaluation terminal 300 includes a housing 204, the display screen 106 (which may include a touch screen), the card reader 108 (e.g., an identification card reader, credit card reader, etc.), the ID card reader 109, the printer 110 having the outlet 112 (e.g., for printing vouchers, receipts, labels, etc.), and the scanner 114 (e.g., barcode scanner) coupled to the terminal 300 via the cord 116. The evaluation terminal 300 also includes the inspection area 220 as a drawer within the housing 204. The inspection area 220 can be similar to that described above with respect to FIG. 2B, for example including a plurality of electrical connectors and imaging components to facilitate evaluation of the electronic device.

In the illustrated embodiment, the evaluation terminal 300 additionally includes a customer interface 328 configured to face a customer 329 at the terminal 300. A detailed front view of the customer interface 328 is illustrated in FIG. 3B. In some embodiments, a plurality of user interface devices are provided on an exterior (e.g., front portion) of the customer interface 328 for providing instructions and other information to customers, and/or for receiving customer inputs and other information from customers. For example, the customer interface 328 can include a display screen 330 (e.g., a liquid crystal display (LCD)) for providing information, prompts, etc. to customers via text, graphics, video, etc. The display screen 330 can include a touch screen for receiving customer inputs and responses to displayed prompts. In addition or alternatively, the customer interface 328 can include or be operably connected to a separate keyboard or keypad for this purpose. The customer interface 328 can also include a card reader 332 (e.g., a card swipe and/or credit card reader) and an ID card reader 333 (e.g., a driver's license card reader).

The customer interface 328 of the evaluation terminal 300 can further include one or more cameras 334 (e.g., a digital still camera, a video camera, etc.) which can be configured to face and view and/or photograph the customer 329 during the transaction. A biometric scanner 336 (e.g., a fingerprint scanner) is also provided. The camera 334 and biometric scanner 336 can be utilized for customer identity verification and to avoid fraud.

Although not identified in FIG. 3B, the customer interface 328 can further include a speaker and/or a headphone jack for audibly communicating information to customers, one or more lights for visually communicating signals or other information to customers, a handset or microphone for receiving verbal input from the customer, as well as other user input and output devices. The input devices may include a touchpad, a pointing device such as a mouse, a joystick, pen, game pad, motion sensor, scanner, bag/package dispenser, a digital signature pad, etc.

As one example of a recycling process using the evaluation terminal 300, the customer 329 can approach the terminal with the electronic device 102 (e.g., a mobile phone; FIG. 2A) for recycling or selling to the retailer. This process can be substantially similar in some respects to that described above with reference to FIGS. 2A-B, however the customer interface 328 of the evaluation terminal 300 provides additional functionality. More specifically, a clerk 331 can receive the customer's electronic device 102 and place it within the inspection area 220 and connect it to one of the electrical connectors 118, and then close the drawer 221 as described above with reference to FIGS. 2A-B. Electrical and visual identification and evaluation of the electronic device 102 can proceed as outlined above with reference to FIGS. 2A-B. After evaluation, an offer price can be determined and presented to the customer via the display screen 330. If the customer accepts the offer price, the identity of the customer can be verified via the customer interface 328. In some embodiments, for example, the customer may be prompted to place his or her identification (e.g., a driver's license) in the ID card reader 333 and/or provide a thumbprint via the biometric scanner 336. As a fraud prevention measure, the evaluation terminal 300 can be configured to transmit an image of the driver's license to a remote computer screen, and an operator at the remote computer can visually compare a display of the picture (and/or other information) on the driver's license to the person standing in front of the evaluation terminal 300, e.g., the customer 329, as viewed by the camera 334 to confirm that the person attempting to sell the electronic device 102 is in fact the person identified by the driver's license. In some embodiments, the camera 334 may be movable to facilitate viewing of customers, as well as other individuals in the proximity of the evaluation terminal 300. In some embodiments a plurality of cameras 334 can be provided. In some embodiments, one or more images of the customer, the customer's identification card, biometric readings (e.g., fingerprint), etc. can be stored or recorded for later access. This can be useful in particular if the transaction is later found to be fraudulent. Additionally, the customer's fingerprint can be checked against records of known fraud perpetrators. If either of these checks indicate that the person selling the electronic device presents a fraud risk, the transaction can be declined and the electronic device 102 returned. In some embodiments, the customer can be prompted to enter additional information via the display screen 330, for example make and model, place or purchase, customer demographic information (gender, age, location, etc.).

Once the customer's identification is verified, an associated label can be printed via the printer 110 and affixed to the electronic device 102. The clerk can bin the electronic device 102 and dispense compensation to the customer as described above with reference to FIGS. 1-2B.

Figure 4:
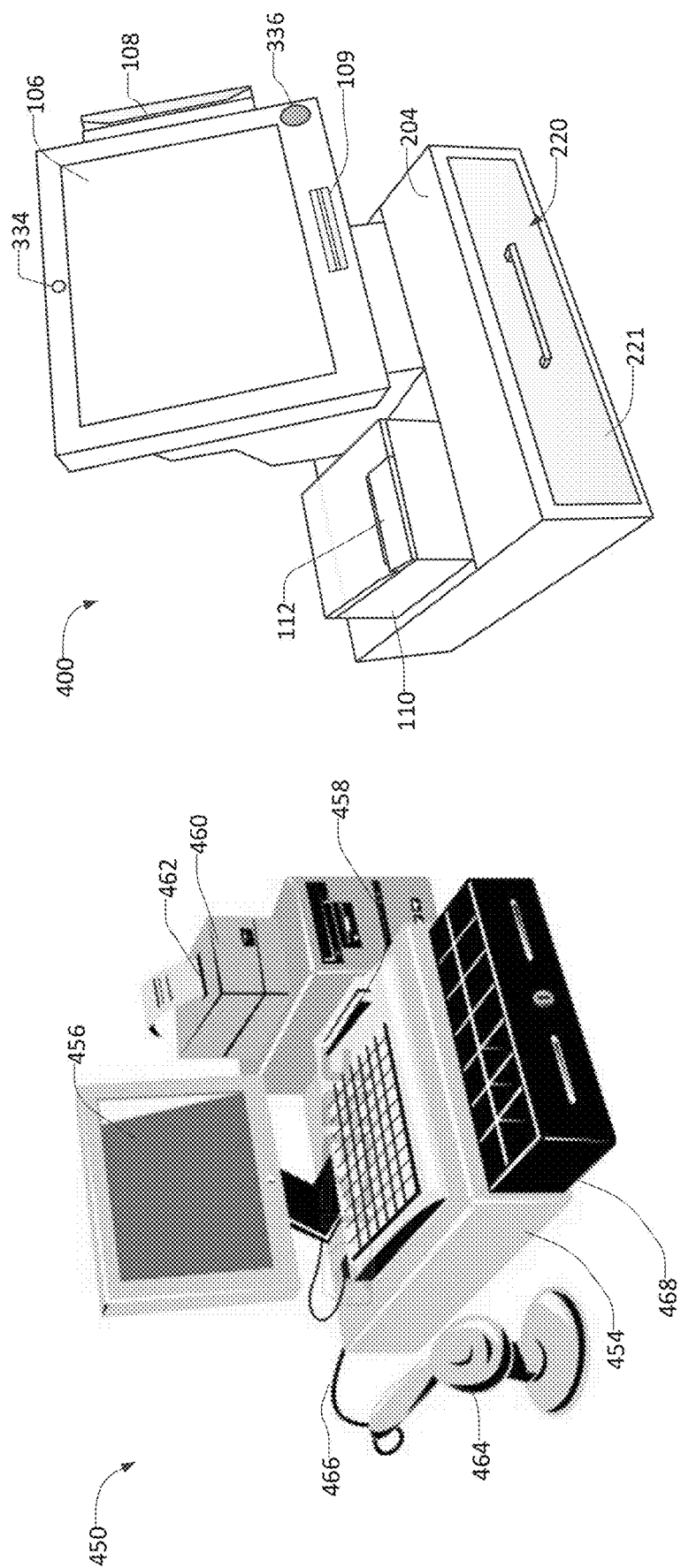
FIG. 4 is a perspective view of yet another system configured in accordance with an embodiment of the present technology for recycling electronic devices.

FIG. 4 is a schematic perspective view of another system for recycling and/or other processing of mobile phones and other consumer electronic devices in accordance with embodiments of the present technology. The system includes an evaluation terminal 400 as well as a cashier terminal 450 that is separate from the evaluation terminal 400. In the illustrated embodiment, the evaluation terminal 400 can be configured for use by a customer to evaluate and price the electronic device 102, after which the customer can take the evaluated electronic device to a clerk at the cashier terminal 450 to submit the device and receive compensation.

The evaluation terminal 400 is similar in some respects to the evaluation terminals 100, 200, and 300 described in detail above. For example, the evaluation terminal 400 includes the housing 204, the display screen 106 (which may include a touch screen), the card reader 108 (e.g., a card-swipe reader, credit card reader, etc.), the ID card reader 109 (e.g., a driver's license reader), and the printer 110 having the outlet 112 (e.g., for printing vouchers, receipts, labels, etc.). The evaluation terminal 400 also includes the inspection area 220 as a drawer within the housing 204. The inspection area 220 can be similar to that described above with respect to FIG. 2B, for example including a plurality of electrical connectors and imaging components to facilitate evaluation of the electronic device.

In the illustrated embodiments, the evaluation terminal 400 additionally includes one or more cameras 334 which can be configured to face the customer during the transaction. A biometric scanner 336 (e.g., a fingerprint scanner) is also provided. The camera 334 and biometric scanner 336 can be utilized for user identity verification and to avoid fraud. Although not identified in FIG. 4, the evaluation terminal 400 can further include a speaker and/or a headphone jack for audibly communicating information to customers, one or more lights for visually communicating signals or other information to customers, a handset or microphone for receiving verbal input from the customer, as well as other user input and output devices. The input devices may include a touchpad, a pointing device such as a mouse, a joystick, pen, game pad, motion sensor, scanner, bag/package dispenser, a digital signature pad, etc.

The cashier terminal 450 can be substantially similar in many respects to a conventional cashier terminal, and can include, for example, a housing 454 that can be of conventional manufacture from, for example, sheet metal, plastic panels, etc. A plurality of user interface devices are provided on an exterior (e.g., front portion) of the housing 454 for providing instructions and other information to users, and/or for receiving user inputs and other information from users. For example, the cashier terminal 450 can include a display screen 456 (e.g., a liquid crystal display (LCD)) for providing information, prompts, etc. to users via text, graphics, video, etc. The display screen 456 can include a touch screen for receiving user inputs and responses to displayed prompts. In addition or alternatively, the cashier terminal 450 can include a separate keyboard or keypad for this purpose. The cashier terminal 450 can also include a card reader 458 (e.g., a driver's license and/or credit card reader). The cashier terminal 450 can additionally include a plurality of output devices such as a printer 460 having an associated outlet 462. The printer 460 can be configured to print receipts, vouchers, and/or labels. The cashier terminal 450 can further include a scanner 464 which can be, for example, a hand-held barcode scanner. In some embodiments, the scanner can be a linear barcode reader, a QR code reader, an NFC reader, or other optical or electrical scanning device. In the illustrated embodiment, the scanner 464 is tethered to the evaluation terminal by a cord 466, allowing the user to manually operate the scanner to read a barcode or other indicia on the electronic device. In other embodiments, the scanner can be rigidly fixed to the cashier terminal 450, or in other embodiments the scanner may be physically separated from the cashier terminal 450 and may wirelessly communicate with the cashier terminal 450.

In some embodiments, the cashier terminal 450 can also serve as a conventional point-of-sale terminal in a retail establishment. For example, in some embodiments the cashier terminal 450 can include a payment dispenser 468

(e.g., a cash drawer) for dispensing payment to a customer. In some embodiments, the payment dispenser 468 can be or include a card dispenser (e.g., to dispense gift cards with stored value), a voucher printer, an electronic payment device (e.g., a terminal for making electronic wire transfers, Paypal transfers, Bitcoin transfers, etc.), etc. In some embodiments, the cashier terminal 450 can be coupled to, but separate from, the point-of-sale terminal in a retail establishment. Although not identified in FIG. 4, the cashier terminal 450 can further include a speaker and/or a headphone jack for audibly communicating information to operators, one or more lights for visually communicating signals or other information to users, a handset or microphone for receiving verbal input from the user, as well as other user input and output devices. The input devices may include a touchpad, a pointing device such as a mouse, a joystick, pen, game pad, motion sensor, scanner, bag/package dispenser, a digital signature pad, etc.

The cashier terminal 450 can also be associated with a bin or other collection station or facility for receiving the electronic devices from customers for secure storage, trade-ins, and/or further processing and recycling. In some embodiments, the bin can be remote from the other components of the cashier terminal 450, for example the bin can be positioned in another location within the store in which the terminals 400 and 450 are located, a warehouse, etc. In some embodiments, the bin can be proximate to the other components, for example the bin can be located beneath the cashier terminal 450. In some embodiments, the bin can be coupled with a scanner or other reader which can read the identifying labels affixed to electronic devices as they are deposited into and/or removed from the bin.

As one example of a recycling process using the evaluation terminal 400, a customer can approach the evaluation terminal 400 with the electronic device 102 (FIG. 2B) for recycling, such as a mobile phone. This process can be similar in some respects to that described above with reference to FIGS. 1-3B. In the embodiment of FIG. 4, however, the evaluation terminal 400 can be configured for customer operation. For example, the customer can approach the evaluation terminal 400, interact with prompts on the display screen 106, and initiate evaluation of the electronic device 102 by placing it in the inspection area 220 and connecting it to one or more of the electrical connectors 218 (e.g., a USB connector, power adapter, etc., see FIG. 2B), and shutting the drawer to place the electronic device 102 within the inspection area 220. Electrical and visual inspection and analysis can then be performed on the electronic device 102 as described above with respect to FIGS. 2A-3B. In the illustrated embodiment, the evaluation terminal 400 can verify the identity of the customer by means of the camera 334, the card reader 108, the ID card reader 109, and/or the biometric scanner 336, similar to that described above with respect to FIGS. 3A-3B. After a price is determined and offered to the customer (e.g., via display screen 106), and the customer accepts the offer price (e.g., via a touch screen or other input), a label can be printed via printer 110 and dispensed via the outlet 112. The customer can then apply the label to the electronic device 102 and take the electronic device 102 to the cashier terminal 450, or in some other embodiments the customer can bring both the label (or instead another type of identification document, e.g., receipt, voucher, etc.) and the electronic device 102 to the cashier terminal 450 without affixing the label to the electronic device 102.

In some embodiments, the identifying label can include machine-readable indicia associated with the identified electronic device 102. For example, the label can include a barcode, QR code, or other machine-readable indicia that, when scanned at the cashier terminal 450 via scanner 464, retrieves the obtained information about the electronic device. In some embodiments, information obtained from the evaluation and identification performed at the evaluation terminal 400 can be stored electronically and may be retrieved by the cashier terminal 450 upon reading the machine-readable indicia. In some embodiments, additional information obtained from other databases can be obtained upon reading the machine-readable indicia, including any applicable takeback offers, rebates, coupons, etc.

The scanner 464 can be, for example a barcode reader, QR code reader, or other such scanner. In some embodiments, the clerk at the cashier terminal 450 can use the scanner 464 to read the barcode, QR code, and/or other machine-readable indicia on the label presented by the customer to download the information about the electronic device 102 onto the cashier terminal 450. After scanning the label and downloading the device information, the device identity and/or condition can be verified at the cashier terminal 450. For example, in some embodiments the cashier terminal 450 can display the device information to the clerk on the display screen 456, and the clerk can visually inspect the electronic device 102 and compare it to the information provided on the display screen 456 to determine whether the device presented by the customer matches the make, model, and other information presented on the display screen 456. In some embodiments, to further facilitate device verification, the display 456 at the cashier terminal 450 can show a stock image of the identified electronic device 102, which can allow the clerk to perform a quick visual comparison between the stock image and the electronic device presented by the customer. For example, if the customer presents a low-end smart phone to the clerk, but after scanning the label the display 456 shows a stock image of a high-end feature phone, the clerk can terminate the transaction. This feature can preclude one type of abuse in which a customer has one device evaluated at the evaluation terminal 400, and then attempts to provide a different device of lesser value to the clerk at the cashier terminal 450 for payment. In some embodiments, rather than a stock image of the device, actual images of the device that the customer evaluated at the evaluation terminal 400 can be used. For example, images taken with cameras 334 while the device was being evaluated at the evaluation terminal 400 can be displayed on the display screen 456 of the terminal 400 for comparison by the clerk. In other embodiments, the clerk may electrically connect the electronic device 102 to electrical connectors provided at the cashier terminal 450. Electrical analysis can then be used to determine whether the presented device matches the device evaluated at the evaluation terminal 400. In some embodiments, the cashier terminal 450 may access a remote server computer 470 to obtain information associated with the electronic device in order to verify that the device presented at the cashier terminal 450 matches the device evaluated at the evaluation terminal 400. For example, the cashier terminal 450 may query databases stored on the remote server computer to retrieve device information and/or pricing information. Once the customer's identification is verified and the device identity and condition is verified, the clerk can dispense compensation to the customer and bin the electronic device 102.

Figure 5:
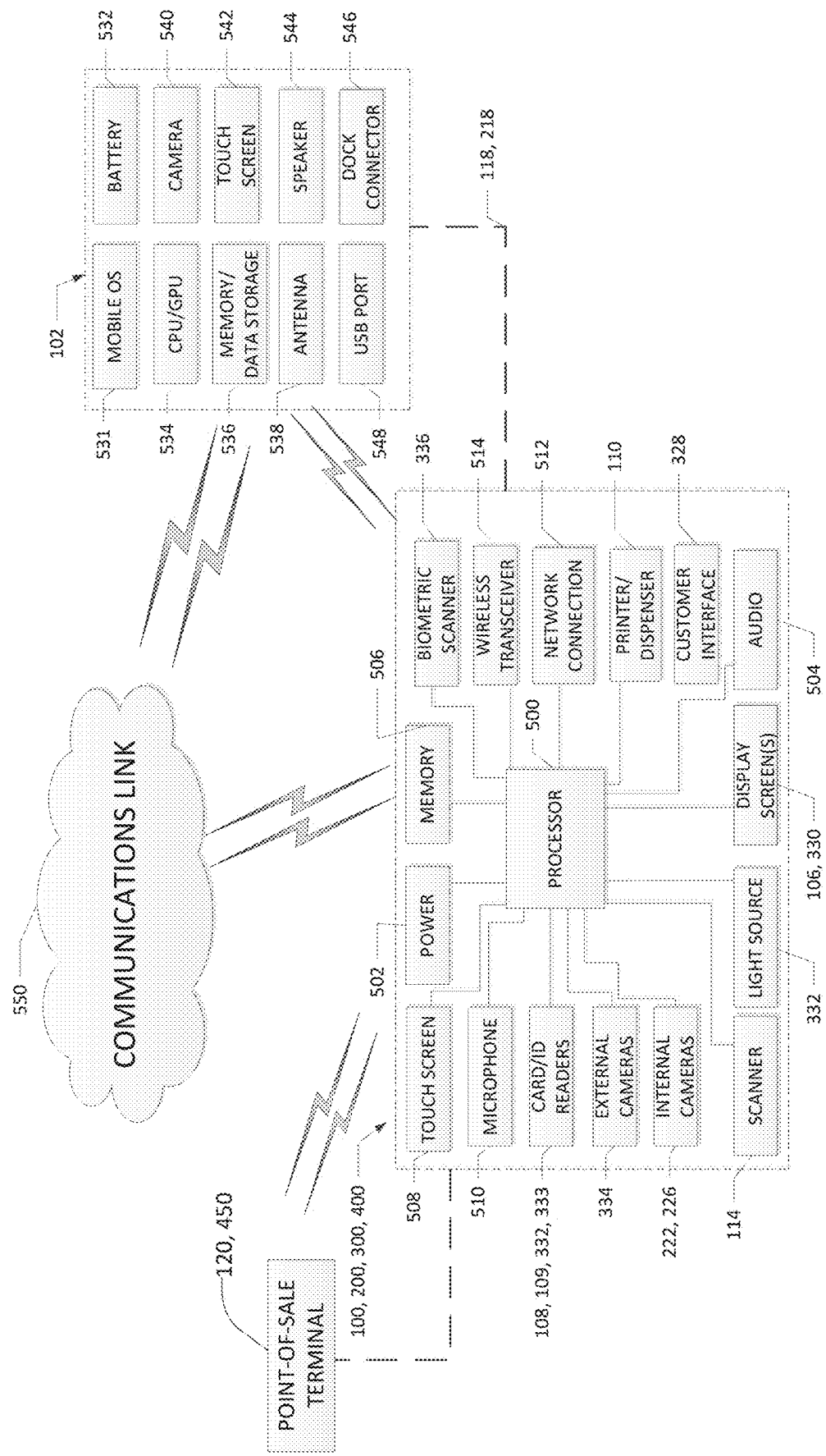
FIG. 5 is a diagram illustrating various components associated with the system of FIG. 3A.

FIG. 5 provides a schematic representation of an architecture of the evaluation terminal 100, 200, 300, 400 in accordance with an embodiment of the present technology. In the illustrated embodiment, the evaluation terminal can be any one of the evaluation terminals 100, 200, 300, and 400 described above, and will by referred to herein as "evaluation terminal 300" for ease of reference. The evaluation terminal 300 includes a suitable processor or central processing unit ("CPU") 500 that controls operation of the evaluation terminal 300 in accordance with computer-readable instructions stored on system memory 506. The CPU 500, for example, can control performance of the various routines associated with processing and evaluating electronic devices as described herein. The CPU 500 may be any logic processing unit, such as one or more CPUs, digital signal processors (DSPs), application-specific integrated circuits (ASICs), etc. The CPU 500 may be a single processing unit or multiple processing units in a device or distributed across multiple devices. The CPU 500 is connected to the memory 506 and may be coupled to other hardware devices, for example, with the use of a bus (e.g., a PCI Express or Serial ATA bus). The CPU 500 can include, by way of example, a standard personal computer ("PC") (e.g., a DELL OPTIPLEX 780 or 7010 PC) or other type of embedded computer running any suitable operating system, such as Linux, Windows, Android, iOS, MAC OS, or an embedded real-time operating system. In some embodiments, the CPU 500 can be a small form factor PC with integrated hard disk drive ("HDD") or solid-state drive ("SSD") and universal serial bus ("USB") or other ports to communicate with the other components of the evaluation terminal 300. In other embodiments, the CPU 500 can include a microprocessor with a standalone motherboard that interfaces with a separate HDD. The memory 506 can include read-only memory (ROM) and random access memory (RAM) or other storage devices, such as disk drives or SSDs, that store the executable applications, test software, databases and other software required to, for example, implement the various routines described herein, control evaluation terminal components, process electronic device information and data (to, e.g., evaluate device make, model, condition, pricing, etc.), communicate and exchange data and information with remote computers and other devices, etc.

The CPU 500 can provide information and instructions to evaluation terminal users via the display screens 106, 330 and/or an audio system (e.g., a speaker) 504. The CPU 500 can also receive user inputs via, e.g., a touch screen 508 associated with the display screen 106, a keypad with physical keys, and/or a microphone 510. Additionally, the CPU 500 can receive personal identification and/or biometric information associated with users via the card/ID readers 108, 109, 332, 333, one or more of the external cameras 334, and/or the biometric scanner 336. In some embodiments, the CPU 500 can also receive information (such as user identification and/or account information) via a card reader 108 (e.g., a debit, credit, or loyalty card reader having, e.g., a suitable magnetic stripe reader, optical reader, etc.). The CPU 500 can also receive information from the scanner 114 and the customer interface 328. The CPU 500 can control operation of the printer 110 and systems for providing remuneration to users, such as a cash dispenser and/or a receipt or voucher printer and an associated dispenser. The CPU can also control operation of the light source 332.

As noted above, the evaluation terminal 300 additionally includes a number of electronic, optical and electromechanical devices for electrically, visually and/or physically analyzing electronic devices placed therein for recycling. Such systems can include one more internal cameras (e.g., imaging components 222, 226) for visually inspecting electronic devices to, e.g., determine the external dimensions and condition, and one or more of the electrical connectors 118, 218 (e.g., USB connectors) for, e.g., powering up electronic devices and performing electronic analyses. As noted above, the imaging components 222, 226 can be operably coupled to the inspection area 220. The evaluation terminal 300 further includes power 502, which can include battery power and/or facility power for operation of the various electrical components associated with evaluation terminal operation.

In the illustrated embodiment, the evaluation terminal 300 further includes a network connection 512 (e.g., a wired connection, such as an Ethernet port, cable modem, FireWire cable, Lightning connector, USB port, etc.) suitable for communication with, e.g., all manner of processing devices (including remote processing devices) via a communication link 550, and a wireless transceiver 514 (e.g., including a Wi-Fi access point; Bluetooth transceiver; near-field communication (NFC) device; wireless modem or cellular radio utilizing GSM, CDMA, 3G and/or 4G technologies; etc.) suitable for communication with, e.g., all manner of processing devices (including remote processing devices) via the communication link 550 and/or directly via, e.g., a wireless peer-to-peer connection. For example, the wireless transceiver 514 can facilitate wireless communication with electronic devices, such as a mobile device 102 (e.g., a smartphone) either in the proximity of the evaluation terminal 300 or remote therefrom. In the illustrated embodiment, the electronic device 102 is depicted as a mobile device, e.g., a mobile phone. In other embodiments, however, the electronic device 102 can be other types of electronic devices including, for example, other handheld devices; PDAs; MP3 players; tablet, notebook, laptop and desktop computers; e-readers; cameras; TVs; DVRs; game consoles; Google Glass™; smart-watches; other wearable computers, etc. By way of example only, in the illustrated embodiment the mobile device 102 can include one or more features, applications and/or other elements commonly found in smartphones and other known mobile devices. For example, the mobile device 102 can include a CPU and/or a graphics processing unit ("GPU") 534 for executing computer readable instructions stored on memory 536. In addition, the mobile device 102 can include an internal power source or battery 532, a dock connector 546, a USB port 548, a camera 540, and/or well-known input devices, including, for example, a touch screen 542, a keypad, etc. In many embodiments, the mobile device 102 can also include a speaker 544 for two-way communication and audio playback. In addition to the foregoing features, the mobile device 102 can include a mobile operating system (OS) 531 and/or a device wireless transceiver that may include one or more antennas 538 for wirelessly communicating with, for example, other mobile devices, websites, and the evaluation terminal 300. Such communication can be performed via, e.g., the communication link 550 (which can include the Internet, public and private intranet, a local or extended Wi-Fi network, cell towers, the plain old telephone system (POTS), etc.), direct wireless communication, etc.

Unless described otherwise, the construction and operation of the various components shown in FIG. 5 are of conventional design. As a result, such components need not be described in further detail herein, as they will be readily understood by those skilled in the relevant art. In other embodiments, the evaluation terminal 300 and/or the mobile device 102 can include other features that may be different from those described above. In still further embodiments, the evaluation terminal 300 and/or the mobile device 102 can include more or fewer features similar to those described above.

Figure 6:
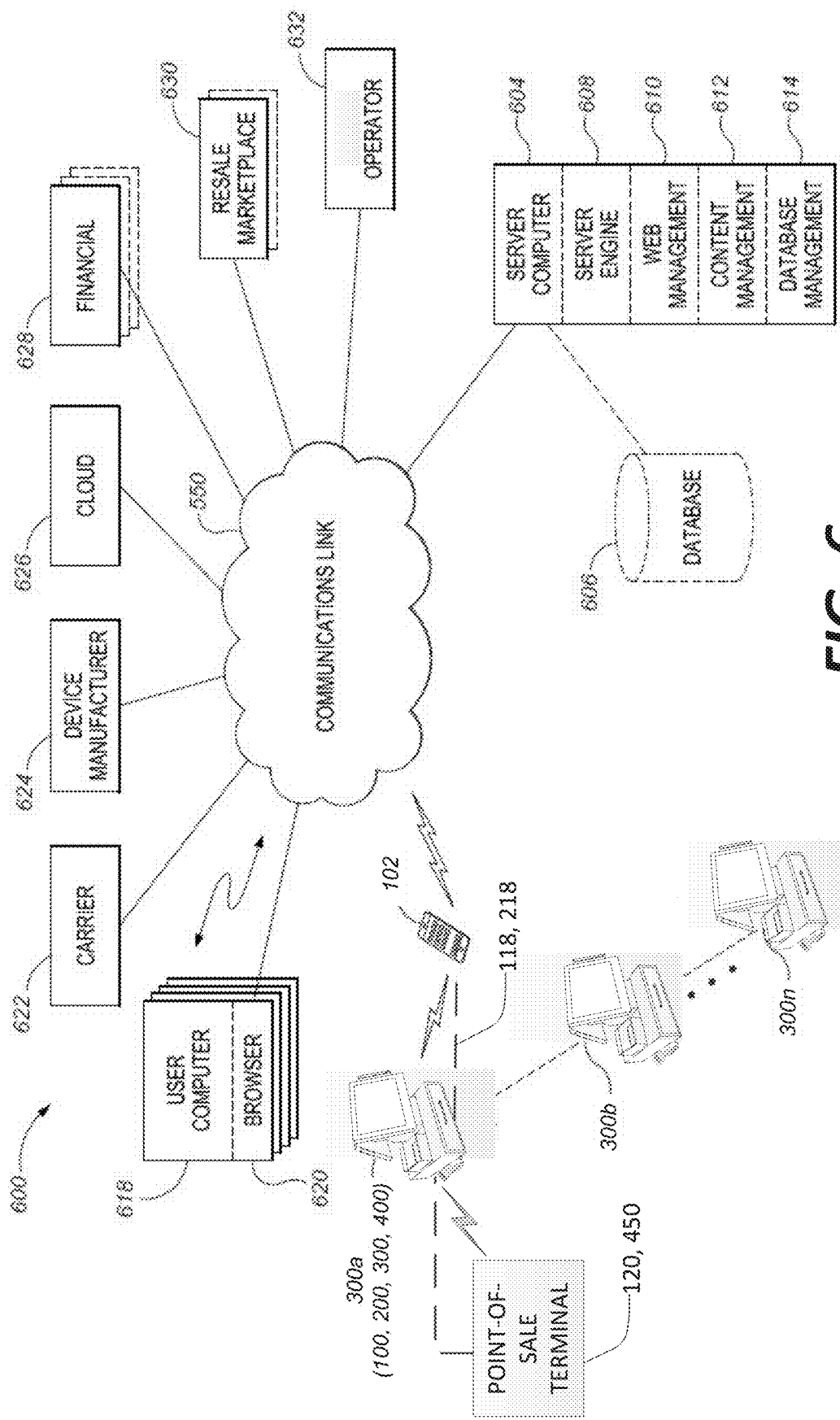
FIG. 6 is a diagram of a suitable distributed computing environment for implementing various aspects of the present technology.

FIG. 6 is a schematic diagram of a suitable network environment for implementing various aspects of an electronic device recycling system 600 configured in accordance with embodiments of the present technology. In the illustrated embodiment, a plurality of the evaluation terminals 300 (identified individually as evaluation terminals 300a-300n) can exchange information with one or more remote computers (e.g., one or more server computers 604) via the communication link 550. Although described with reference to the evaluation terminal 300, a similar architecture can be employed for the other embodiments described herein (e.g., the evaluation terminal 100, evaluation terminal 200, evaluation terminal 400, and cashier terminal 450). Although the communication link 550 can include a publically available network (e.g., the Internet with a web interface), a private communication link, such as an intranet or other network may also be used. Moreover, in various embodiments the individual evaluation terminal 300 can be connected to a host computer (not shown) that facilitates the exchange of information between the evaluation terminals 300 and remote computers, other terminals, mobile devices, etc.

The server computer 604 can perform many or all of the functions for receiving, routing and storing electronic messages, such as webpages, audio signals and electronic images necessary to implement the various electronic transactions described herein. For example, the server computer 604 can retrieve and exchange web pages and other content with an associated database or databases 606. In some embodiments, the database 606 can include information related to mobile phones and/or other consumer electronic devices. Such information can include, for example, make, model, serial number, IMEI, MEID, carrier plan information, pricing information, owner information, etc., as well as dimensional information (size, shape, location of displays, ports, etc.) and other visual information (e.g., logo shapes, sizes, locations, etc.) associated with known devices, such as particular device models, sub-models, etc. In various embodiments the server computer 604 can also include a server engine 608, a web page management component 610, a content management component 612, and a database management component 614. The server engine 608 can perform the basic processing and operating system level tasks associated with the various technologies described herein. The web page management component 610 can handle creation and/or display and/or routing of web or other display pages. The content management component 612 can handle many of the functions associated with the routines described herein. The database management component 614 can perform various storage, retrieval and query tasks associated with the database 606, and can store various information and data such as animation, graphics, visual and audio signals, etc. Those of ordinary skill in the art will appreciate that many of the routines and/or portions thereof and other functions and methods described above can be performed by the evaluation terminal 300 (e.g., the processor 500), the server computer 604, or both.

In the illustrated embodiment, the evaluation terminals 300 can also be operably connected to a plurality of other remote devices and systems via the communication link 550. For example, the evaluation terminals 300 can be operably connected to a plurality of user devices 618 (e.g., personal computers, laptops, handheld devices, etc.) having associated browsers 620. Similarly, as described above the evaluation terminals 300 can each include wireless communication facilities for exchanging digital information with mobile devices, such as the mobile device 102. The evaluation terminals 300 and/or the server computer 604 are also operably connectable to a series of remote computers for obtaining data and/or exchanging information with necessary service providers, financial institutions, device manufactures, authorities, government agencies, etc. For example, the evaluation terminals 300 and the server computer 604 can be operably connected to one or more cell carriers 622, one or more device manufacturers 624 (e.g., mobile phone manufacturers), one or more electronic payment or financial institutions 628, one or more databases (e.g., the GSMA International Mobile Equipment Identity Database, etc.), and one or more computers and/or other remotely located or shared resources associated with cloud computing 626. The financial institutions 628 can include all manner of entity associated with conducting financial transactions, including banks, credit/debit card facilities, online commerce facilities, online payment systems, virtual cash systems, money transfer systems, etc.

In addition to the foregoing, the evaluation terminals 300 and the server computer 604 can also be operably connected to a resale marketplace 630 and an operator 632. The resale marketplace 630 represents a system of remote computers and/or services providers associated with the reselling of consumer electronic devices through both electronic and brick-and-mortar channels. Such entities and facilities can be associated with, for example, online auctions for reselling used electronic devices as well as for establishing market prices for such devices. The operator 632 can be a central computer or system of computers for controlling all manner of operation of the network of evaluation terminals 300. Such operations can include, for example, remote monitoring and facilitating of evaluation terminal maintenance (e.g., remote testing of terminal functionality, downloading operational software and updates, etc.), servicing (e.g., periodic replenishing of cash and other consumables), performance, etc. In addition, the operator 632 can further include one or more display screens operably connected to cameras located at each of the evaluation terminals 300 (e.g., one or more of the cameras 334 described above with reference to FIG. 3B). This remote viewing capability enables operator personnel to verify user identification and/or make other visual observations at the evaluation terminals 300 in real-time during transactions.

The foregoing description of the electronic device recycling system 600 illustrates but one possible network system suitable for implementing the various technologies described herein. Accordingly, those of ordinary skill in the art will appreciate that other systems consistent with the present technology can omit one or more of the facilities described in reference to FIG. 6 or may include one or more additional facilities not described in detail in FIG. 6.

Those of ordinary skill in the art will appreciate that the routines and other functions and methods described above can be performed by various processing devices, such as the processor 500 (FIG. 5), the server computer 604 (FIG. 6), or both. The processes can be implemented as an application specific integrated circuit (ASIC), by a digital signal processing (DSP) integrated circuit, through conventional programmed logic arrays or circuit elements. While many of the embodiments are shown and described as being implemented in hardware (e.g., one or more integrated circuits designed specifically for a task), such embodiments could equally be implemented in software and be performed by one or more processors. Such software can be stored on any suitable computer-readable medium, such as microcode stored in a semiconductor chip, on a computer-readable disk, or downloaded from a server and stored locally at a client.

The evaluation terminals 300, mobile devices 102, server computers 604, user computers and/or other user devices 618, etc. may include one or more central processing units or other logic-processing circuitry, memory, input devices (e.g., keyboards and pointing devices), output devices (e.g., display devices and printers), and storage devices (e.g., magnetic, solid state, fixed and floppy disk drives, optical disk drives, etc.). Such computer devices may include other program modules such as an operating system, one or more application programs (e.g., word processing or spread sheet applications), and the like. The user computers may include wireless computers, such as mobile phones, personal digital assistants (PDAs), palm-top computers, etc., which communicate with the Internet via a wireless link. The computers may be general-purpose devices that can be programmed to run various types of applications, or they may be single-purpose devices optimized or limited to a particular function or class of functions. Aspects of the invention may be practiced in a variety of other computing environments.

While the Internet is shown, a private network, such as an intranet may likewise be used herein. The network may have a client-server architecture, in which a computer is dedicated to serving other client computers, or it may have other architectures such as peer-to-peer, in which one or more computers serve simultaneously as servers and clients. A database or databases, coupled to the server computer(s), stores much of the web pages and content exchanged between the user computers. The server computer(s), including the database(s), may employ security measures to inhibit malicious attacks on the system and preserve the integrity of the messages and data stored therein (e.g., firewall systems, message encryption and/or authentication (e.g., using transport layer security (TLS) or secure socket layers (SSL)), password protection schemes, encryption of stored data (e.g., using trusted computing hardware), and the like).

One skilled in the relevant art will appreciate that the concepts of the invention can be used in various environments other than location based or the Internet. In general, a display description may be in HTML, XML or WAP format, email format or any other format suitable for displaying information (including character/code-based formats, algorithm-based formats (e.g., vector generated), and bitmapped formats). Also, various communication channels, such as local area networks, wide area networks, or point-to-point dial-up connections, may be used instead of the Internet. The system may be conducted within a single computer environment, rather than a client/server environment. Also, the user computers may comprise any combination of hardware or software that interacts with the server computer, such as television-based systems and various other consumer products through which commercial or noncommercial transactions can be conducted. The various aspects of the invention described herein can be implemented in or for any e-mail environment.

Although not required, aspects of the invention are described in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like, are generally used interchangeably herein, and refer to any of the above devices and systems, as well as any data processor. Input devices may include a touchpad, keyboard and/or a pointing device such as a mouse. Other input devices are possible such as a microphone, joystick, pen, game pad, scanner, digital camera, video camera, and the like. The data storage devices may include any type of computer-readable media that can store data accessible by a computer, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to a network such as a local area network (LAN), wide area network (WAN) or the Internet.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. The data storage devices may include any type of computer-readable media that can store data accessible by a computer, such as magnetic hard and floppy disk drives, optical disk drives, magnetic cassettes, tape drives, flash memory cards, DVDs, Bernoulli cartridges, RAM, ROMs, smart cards, etc. Indeed, any medium for storing or transmitting computer-readable instructions and data may be employed, including a connection port to a network such as a LAN, WAN, or the Internet. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). The terms "memory" and "computer-readable storage medium" include any combination of temporary, persistent, and/or permanent storage, e.g., ROM, writable memory such as RAM, writable non-volatile memory such as flash memory, hard drives, solid state drives, removable media, and so forth, but do not include a propagating signal per se.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like, are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples—alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims. Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. A system for purchasing electronic devices, the system comprising:
  an evaluation terminal for performing a first portion of an electronic device purchase transaction, the evaluation terminal comprising:
    a user interface configured to receive user input associated with an electronic device; and
    a first processor in communication with the user interface, the first processor configured to:
      interact with the electronic device via a wired electrical connector and/or a wireless transceiver;
      facilitate determining a compensation value to pay the user for the electronic device, wherein the compensation value is at least partially based on the interaction with the electronic device; and
      associate the electronic device with a unique identifier; and
  a cashier terminal configured to receive the electronic device and perform a second portion of the electronic device purchase transaction, wherein the cashier terminal is separate from the evaluation terminal and operably connected to the evaluation terminal, the cashier terminal comprising:
    a display; and
    a second processor configured to:
      receive the unique identifier;
      based on the unique identifier, retrieve information about the electronic device and cause the display to display an image of the electronic device or a sample image of a sample electronic device similar to the electronic device;
      at least partially verify the electronic device based on the retrieved information; and
      when the electronic device has been at least partially verified, facilitate payment of the compensation value to the user in exchange for the electronic device.

2. The system of claim 1 wherein the evaluation terminal further comprises an inspection area comprising the wired electrical connector, and wherein the first processor is configured to interact with the electronic device via the wired electrical connector.

3. The system of claim 1 wherein the second processor is further configured to:
when the device has been at least partially verified, cause the cashier terminal to dispense the compensation value to the user in exchange for the electronic device.

4. The system of claim 1 wherein the evaluation terminal further comprises:
a housing enclosing the first processor; and
an inspection area, wherein the inspection area comprises at least one imaging component, wherein the first processor is configured to visually inspect the electronic device via the imaging component, and wherein the compensation is at least partially based on the visual inspection.

5. The system of claim 1 wherein the evaluation terminal is configured to facilitate recycling of a mobile phone, a wearable computer, a laptop computer, a tablet, an MP3 player, a DVD player, and a camera.

6. The system of claim 1, further comprising a secure binning area having a third processor configured to receive the unique identifier and at least partially verify the electronic device based on the unique identifier, the secure binning area configured to receive the electronic device after the compensation value has been dispensed to the user.

7. The system of claim 1 wherein the evaluation terminal further comprises an imaging component, wherein the first processor is configured to obtain an image of the user via the imaging component, and wherein the second processor is configured to cause the display to display the image of the user at the cashier terminal.

8. The system of claim 1 wherein the evaluation terminal further comprises an identification card reader in communication with the first processor, wherein the identification card reader is configured to obtain an image of an identification card;
wherein the second processor is configured to cause the display to display an image at the cashier terminal of the user obtained from a user identification card obtained by the identification card reader.

9. The system of claim 1 wherein the second processor is configured to cause the display to display an image of the electronic device after receiving the unique identifier.

10. The system of claim 9 wherein the image comprises an image obtained of the electronic device at the evaluation terminal.

11. The system of claim 1 wherein the second processor is configured to cause the display to display sample image of a sample electronic device similar to the electronic device associated with the unique identifier.

12. The system of claim 1 wherein the evaluation terminal further comprises a means for verifying an identity of the user.

13. The system of claim 1 wherein the evaluation terminal further comprises a means for imaging the electronic device.

14. The system of claim 1 wherein the evaluation terminal is configured to provide a tangible medium containing machine-readable indicia, and wherein the cashier terminal is configured to read the machine-readable indicia to obtain the unique identifier.

15. The system of claim 14 wherein the machine-readable indicia includes at least one of a barcode or a OR code.

16. The system of claim 1 wherein the evaluation terminal is configured to provide an adhesive-backed label configured to be adhered to the electronic device, wherein the label contains machine-readable indicia, and wherein the cashier terminal is configured to read the machine-readable indicia to obtain the unique identifier.

* * * * *